Aug. 26, 1924.
B. M. SHIPLEY
1,506,260
CASH REGISTER
Original Filed Jan. 30, 1920    12 Sheets-Sheet 8
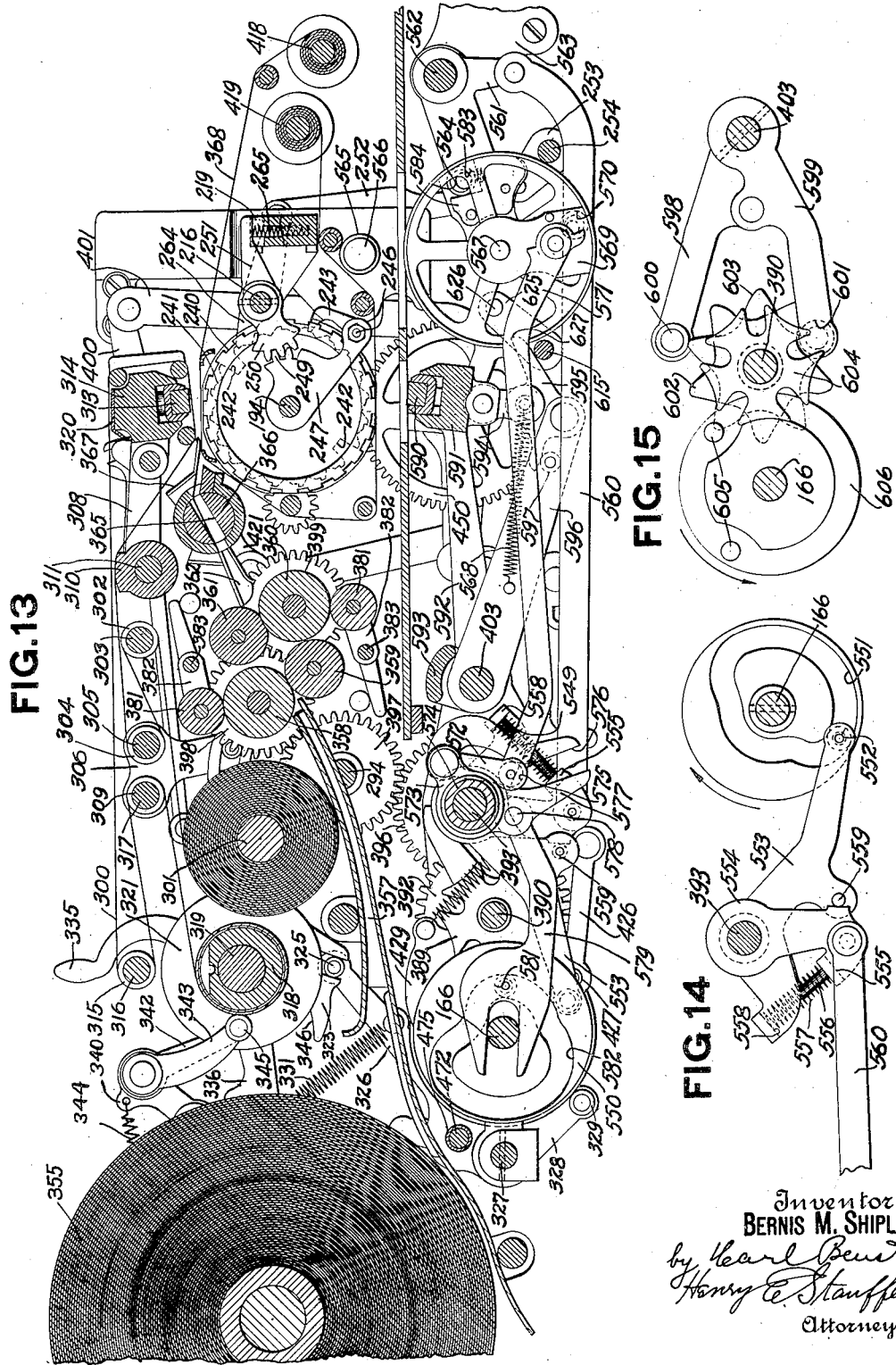
Inventor
BERNIS M. SHIPLEY
by Carl Beust
Henry E. Stauffer
Attorneys Aug. 26, 1924.

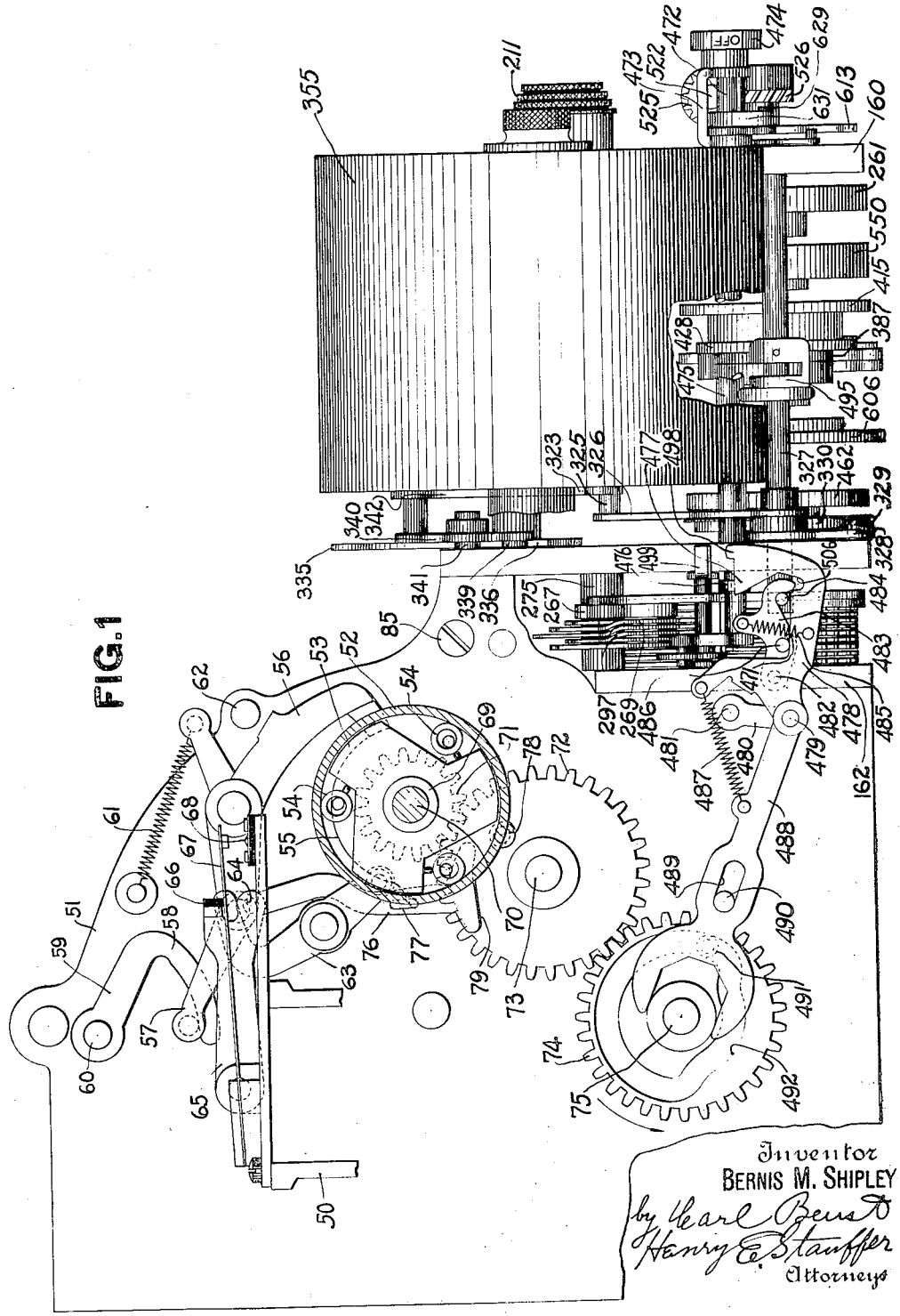

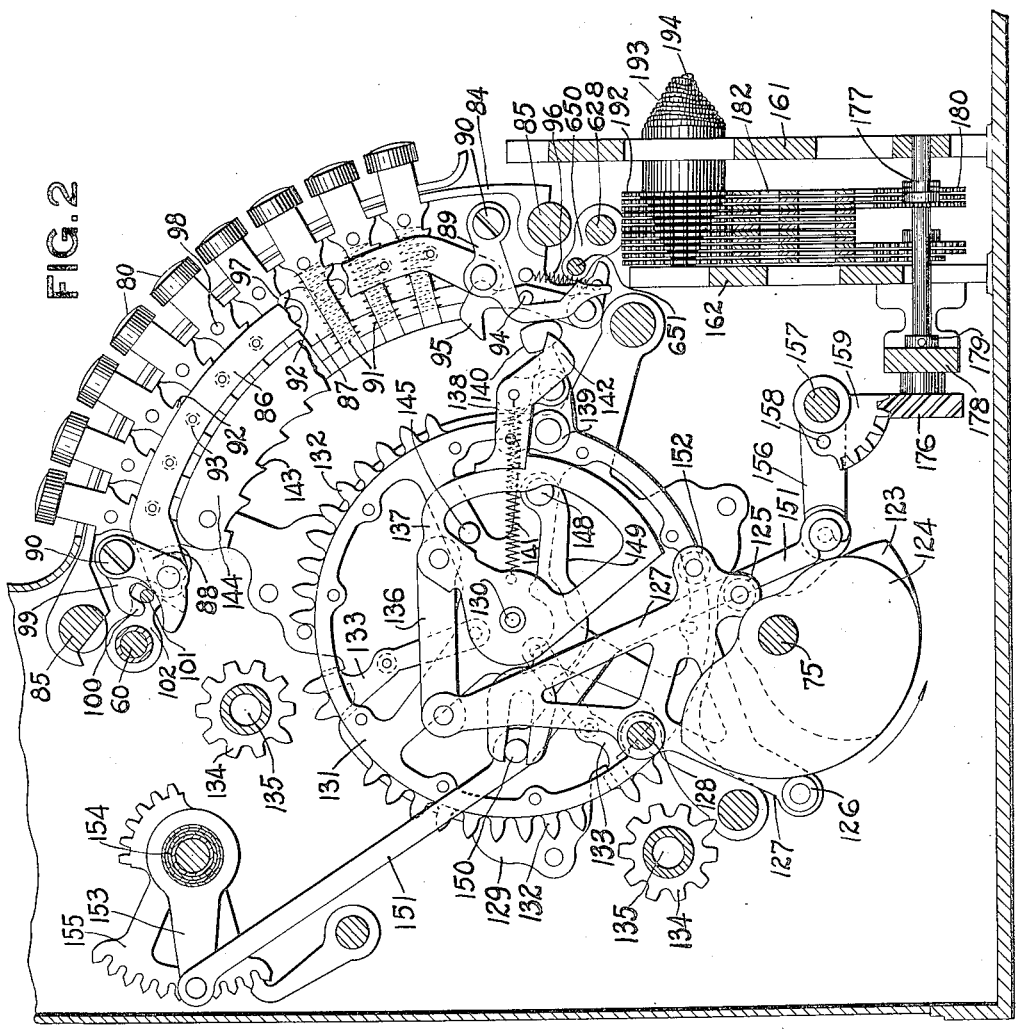

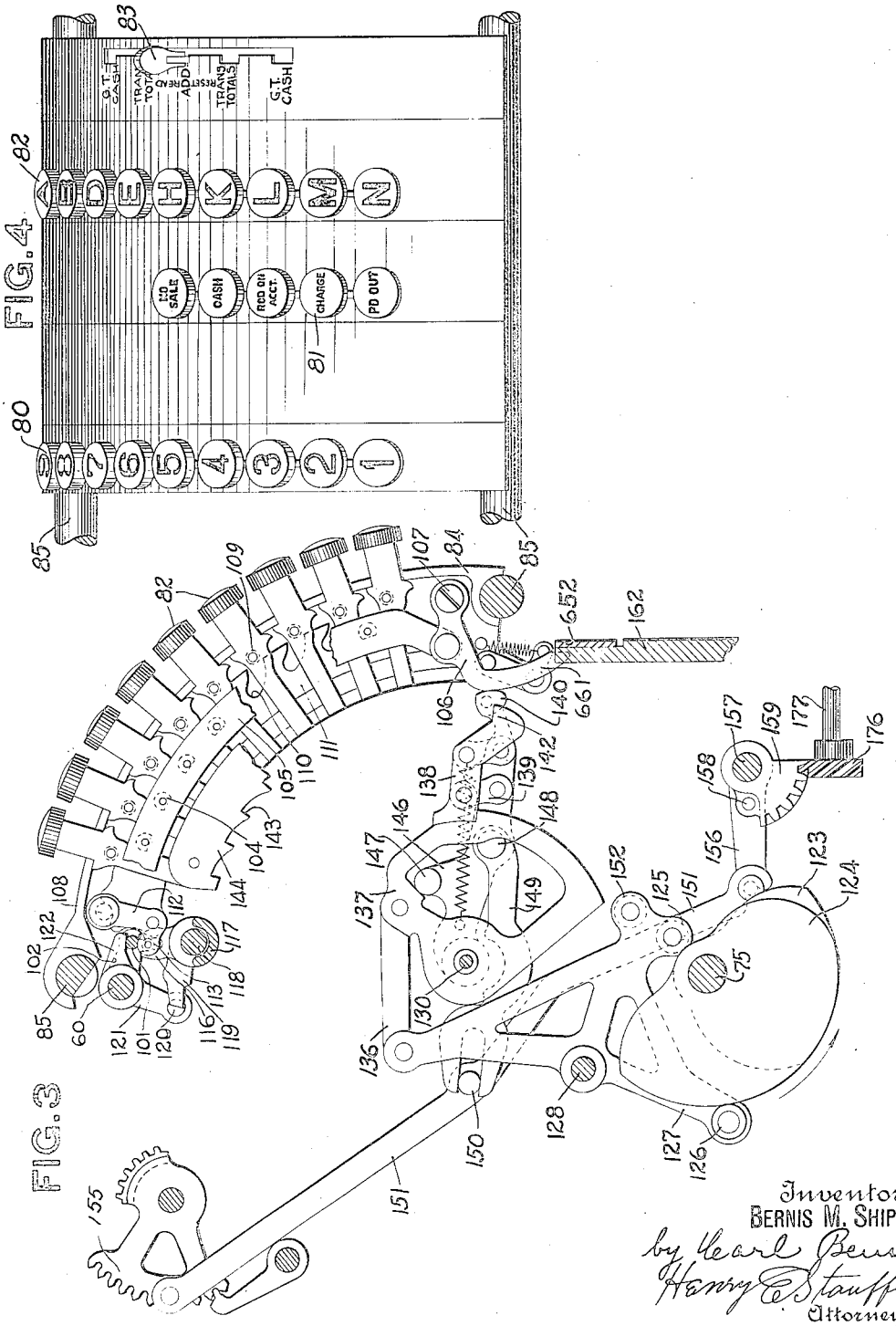

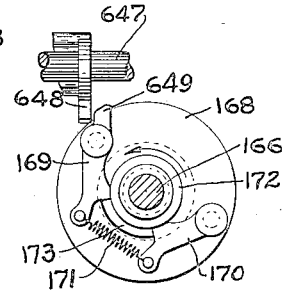

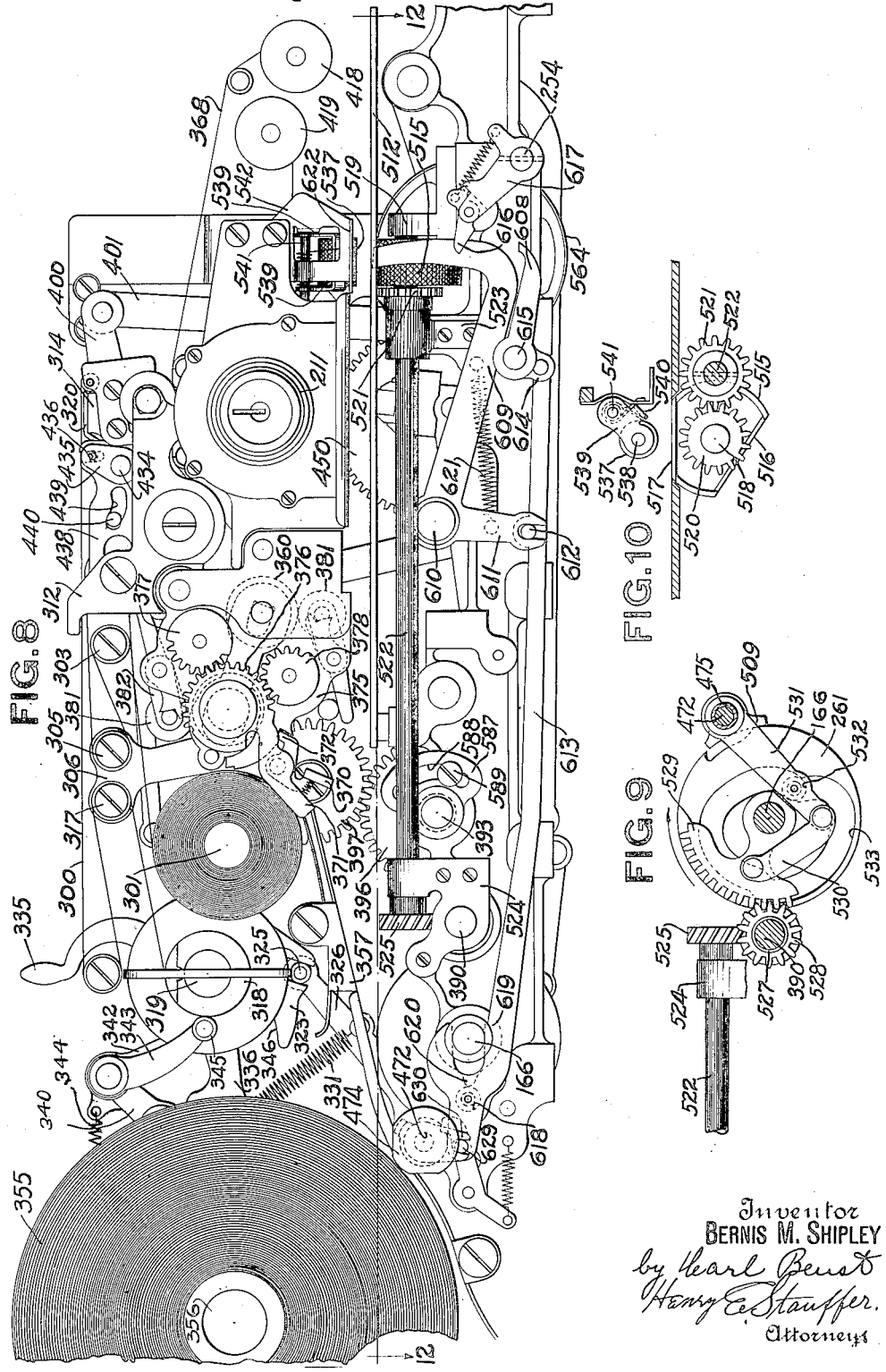

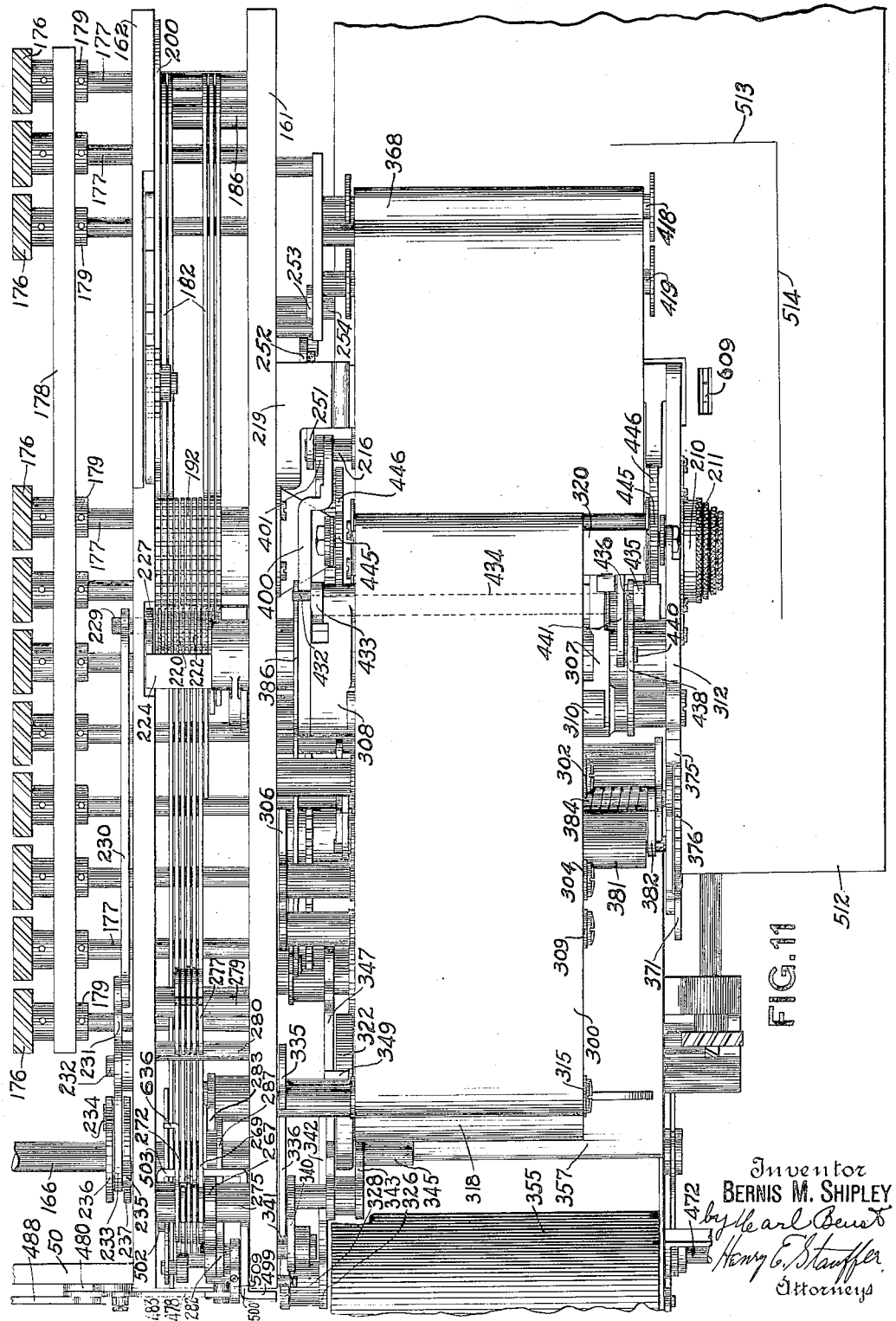

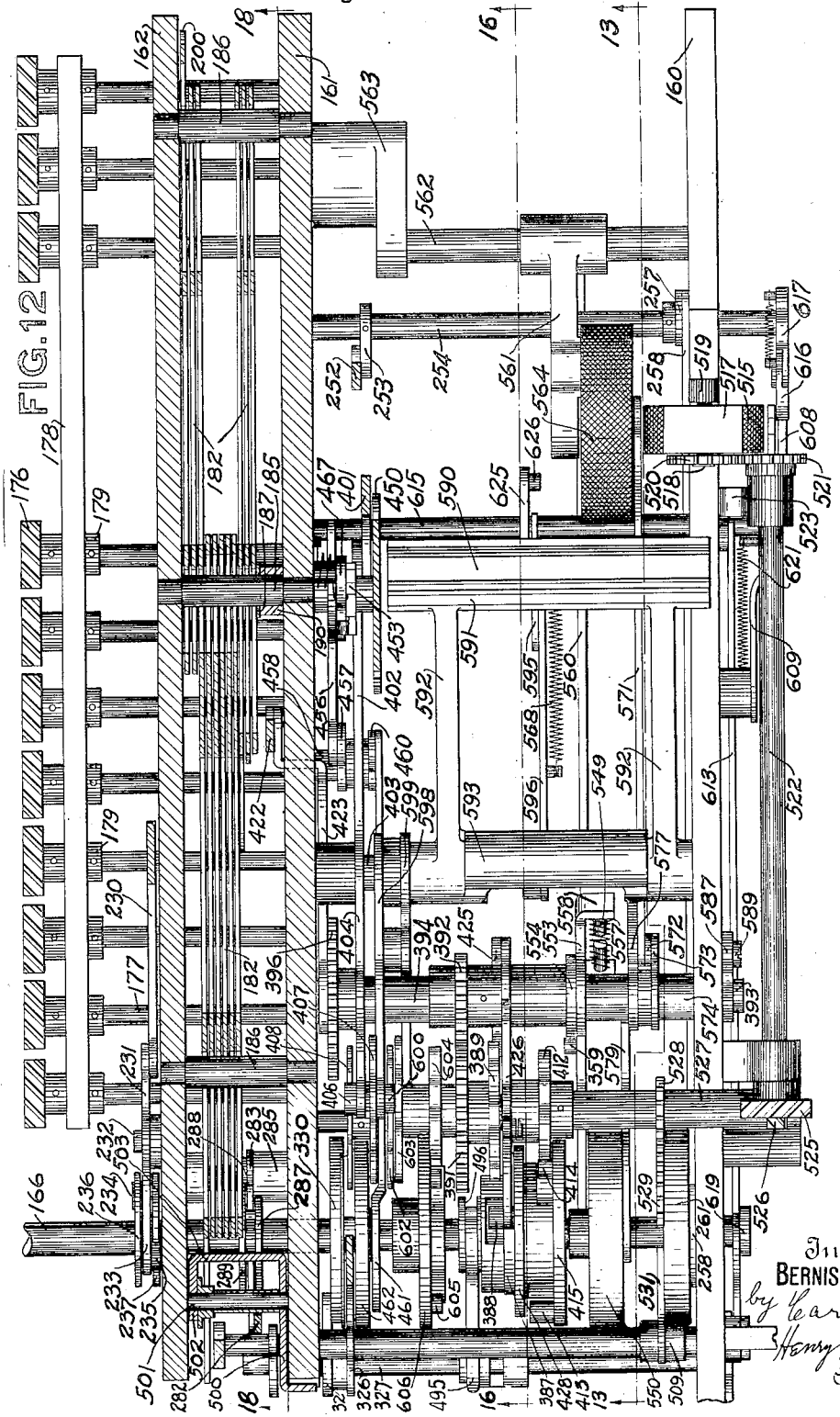

B. M. SHIPLEY 1,506,260

CASH REGISTER

Original Filed Jan. 30, 1920   12 Sheets-Sheet 9

Inventor
BERNIS M. SHIPLEY
by Hearl Bent
Henry E. Stauffer
Attorneys

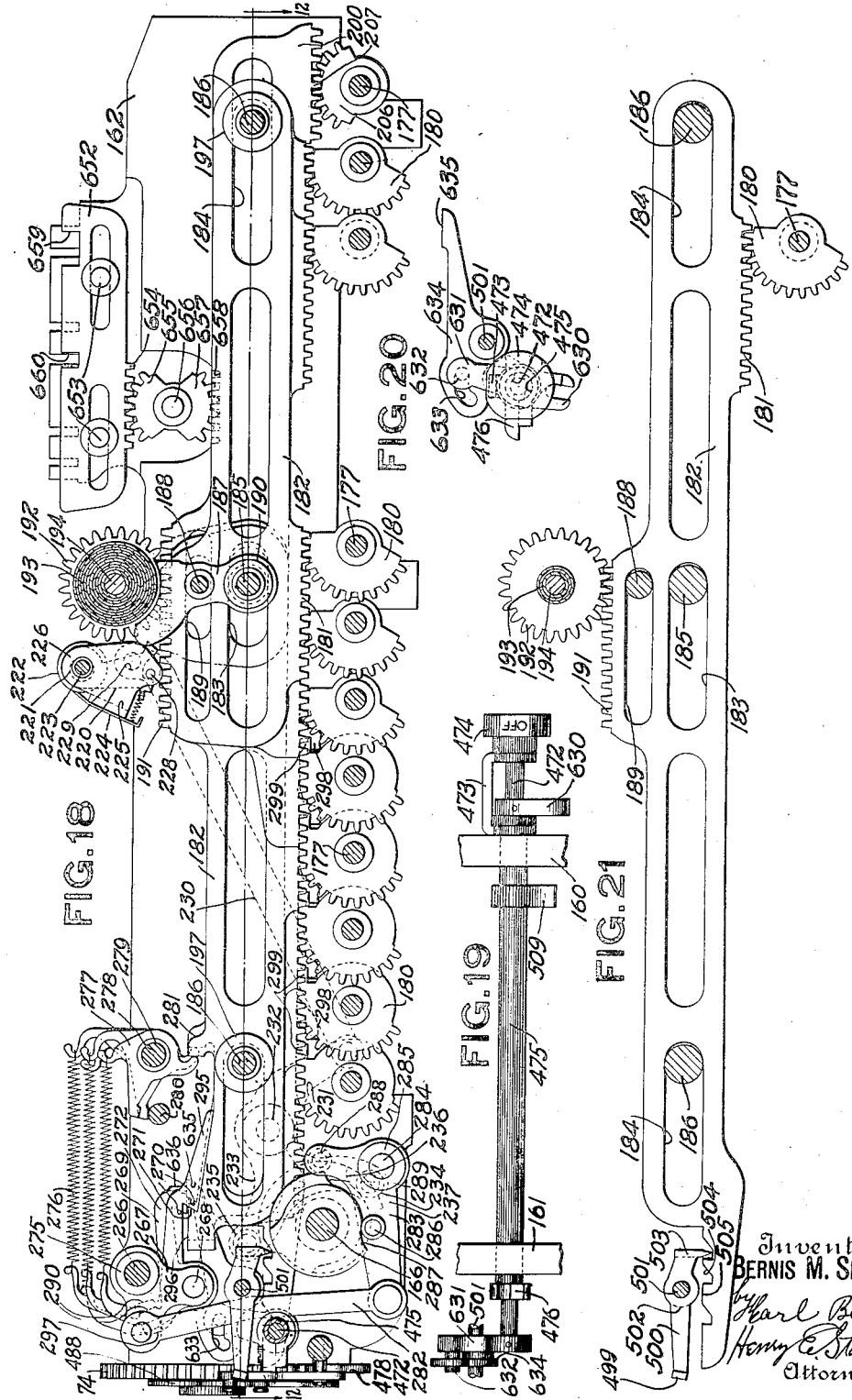

Aug. 26, 1924.  
B. M. SHIPLEY  
CASH REGISTER  
Original Filed Jan. 30, 1920    12 Sheets-Sheet 11
1,506,260
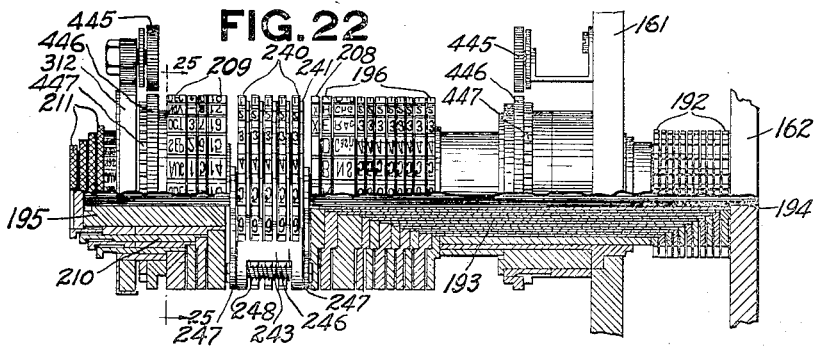
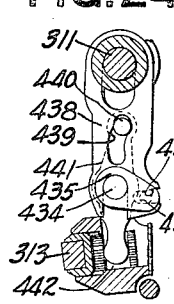
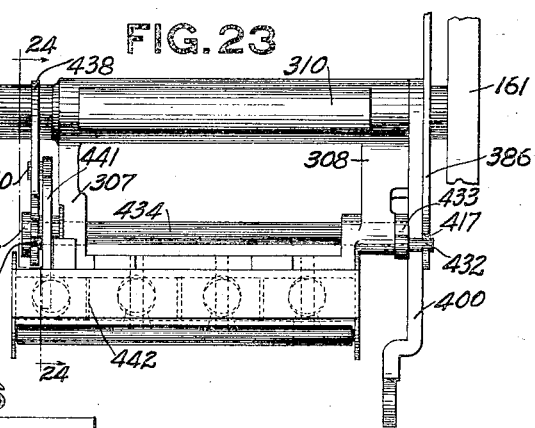
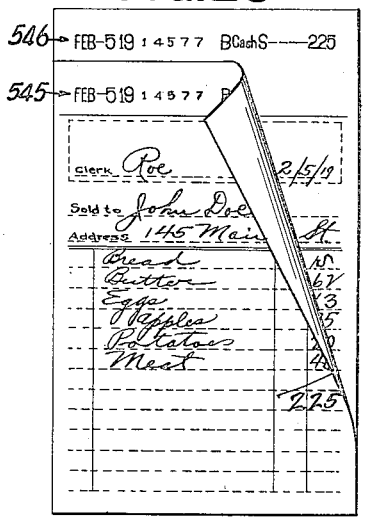
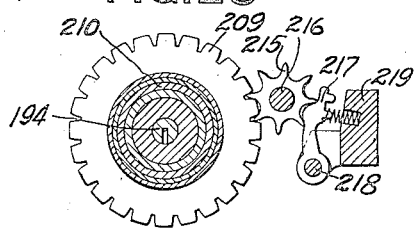
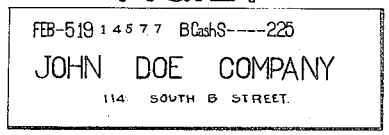
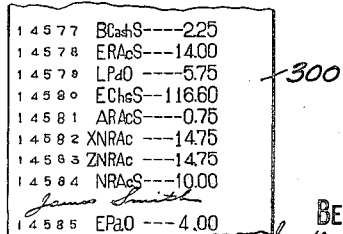
Inventor  
BERNIS M. SHIPLEY  
by Carl Beust  
Henry E. Stauffer  
Attorneys

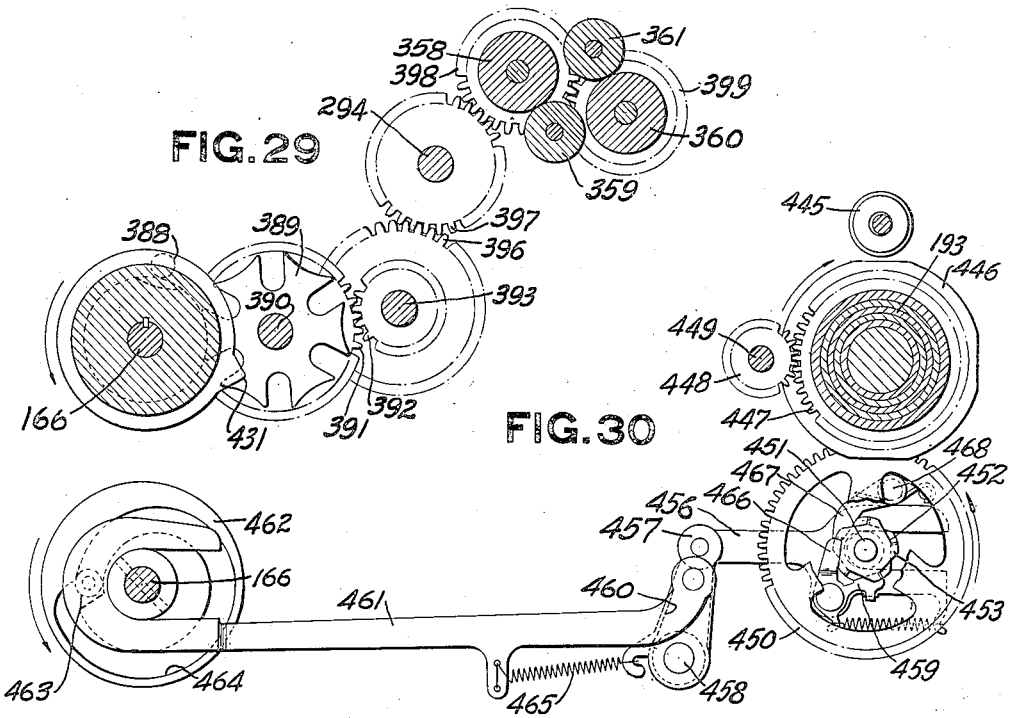

Patented Aug. 26, 1924.

1,506,260

UNITED STATES PATENT OFFICE.

BERNIS M. SHIPLEY, OF DAYTON, OHIO, ASSIGNOR TO THE NATIONAL CASH REGISTER COMPANY, OF DAYTON, OHIO.

CASH REGISTER.

Application filed January 30, 1920, Serial No. 355,172. Renewed February 8, 1923.

*To all whom it may concern:*

Be it known that I, BERNIS M. SHIPLEY, a citizen of the United States, residing at Dayton, in the county of Montgomery and State of Ohio, have invented certain new and useful Improvements in Cash Registers, of which I declare the following to be a full, clear, and exact description.

This invention relates to cash registers and the like and particularly to printing mechanisms therefor, the primary object being to devise an improved printing mechanism of the types illustrated in Letters Patent of the United States to Frederick L. Fuller, No. 1,242,170, dated October 9, 1917 and No. 1,394,256 dated October 18, 1921. This improved printing mechanism is adapted to be used on machines of the type illustrated in the above mentioned patents.

This improved printing mechanism is adapted to print upon and issue a check, to print upon an inserted slip or other paper, to print a permanent record or detail strip of all transactions, and also to print totals commensurate with amounts which have been accumulated upon the totalizers such as have been described in the first mentioned Fuller patent.

One of the main objects of the present invention is to provide a slip placing and feeding mechanism so that when it is desired to print upon a slip, and especially a narrow one, the operator has only to place said slip upon the table in a certain position. Upon operation of the machine the slip placing mechanism grips the slip and places it in the proper position for receiving the first print, the slip is then fed and receives a second print, and is then ejected upon the table. When using a narrow slip it is very hard for the operator to place the slip in its proper position for printing, and the positioning of the slip also consumes considerable time. The above slip placing device obviates all of the trouble incurred by placing the slip by hand, and also insures that the impressions will be in the proper place upon the slip.

Another object of the invention is to improve the check issuing and the check ejecting mechanism, so that there is no danger of the check ever being drawn back into the machine after it has once been cut from the check paper strip.

An improvement has also been made in the automatic check device which issues a check when the keys which represent money taken in or paid out are operated, regardless of the position in which the manual check control knob is set. These keys in the preferred form are the "cash," "received on account" and "paid out" keys.

The check paper guides also have been improved and made straighter, so that it is much easier to feed the check paper from the supply roll up to the knife when putting in a new roll of paper.

The zero eliminating device has also been improved.

The above mentioned improvements will be hereinafter described in detail.

With these and incidental objects in view, the invention consists in certain novel features of construction and combinations of parts, the essential elements of which are set forth in the appended claims, and a preferred form of embodiment of which is hereinafter described with reference to the drawings which accompany and form part of the specification.

Of said drawings:—

Fig. 1 is a left hand elevation of the machine and the printing mechanism, showing a part of the motor drive, and illustrating the automatic check device and part of the zero elimination.

Fig. 2 is a vertical section looking toward the right, illustrating the amount keys and the connection between the differential mechanism and the mechanism for setting up the type wheels.

Fig. 3 is a vertical section looking toward the right, illustrating the clerks' key bank, and showing the differential mechanism for this bank and its connection to the printing mechanism, and also illustrating a part of the release mechanism for the machine.

Fig. 4 is a front elevation of one of the amount banks, the clerks' key bank, the transaction key bank, and the totalizing lever.

Fig. 5 is a view looking toward the left, illustrating the driving connections from the main shaft to the printer shaft, and also showing the mechanism for permitting only one revolution of the printer shaft when the main shaft makes two revolutions during totalizing operations.

Fig. 6 is a detail view of the driving and retaining pawls for the printer drive shaft, and shows clearly their connection to said shaft.

Fig. 7 is a view of the totalizing lever and the mechanism it operates to lock out the key banks, and to control the printer in totalizing operations, looking toward the left.

Fig. 8 is a front elevation of the improved printing mechanism, a part of the check roll being broken away.

Fig. 9 is a detail view of the slip placing operating mechanism.

Fig. 10 is a detail view of the slip placing mechanism.

Fig. 11 is a top plan view of the improved printing mechanism.

Fig. 12 is a horizontal sectional view taken on line 12—12 of Fig. 8 and line 12—12 of Fig. 18, looking in the direction indicated by the arrows.

Fig. 13 is a vertical sectional view taken on line 13—13 of Fig. 12, looking in the direction indicated by the arrows.

Fig. 14 is a view illustrating the cam and a part of the mechanism for feeding the slip between the two prints thereon.

Fig. 15 is a detail view of the lower impression operating mechanism.

Fig. 18 is a vertical sectional view taken on line 18—18 of Fig. 12, and looking in the direction indicated by the arrows, and illustrates the type setting racks and the driving segments therefor and also the improved zero eliminating device.

Fig. 19 is a detail view illustrating the manual control of the check issuing mechanism whereby a check may be issued upon the depression of any of the transaction keys, and also illustrating a part of the so-called "S" printing device.

Fig. 20 is an end view of the mechanism illustrated in Fig. 19.

Fig. 21 is a detail view of the rack associated with the transaction bank, with the means for driving the rack, and also illustrates the connection with the type line and the automatic check device.

Fig. 22 is a detail view of the type line, part of it being shown in section to more clearly illustrate the connection between the type wheels and the rack driven gears.

Fig. 23 is a detail view illustrating the upper impression mechanism, and also illustrating the mechanism for eliminating the printing of the date upon the detail strip.

Fig. 24 is a sectional view taken on line 24—24 of Fig. 23 looking in the direction indicated by the arrows.

Fig. 25 is a sectional view on line 25—25 of Fig. 22, looking in the direction indicated by the arrows, and illustrates the aligning mechanism for the date wheels.

Fig. 26 illustrates a sample sales slip and the impressions taken thereupon from the type line.

Fig. 27 illustrates a sample check as printed and issued by the machine.

Fig. 28 illustrates a fragmentary portion of the detail strip as printed by the improved printing mechanism.

Fig. 29 is a view of the gear train and Geneva drive mechanism for the check issuing mechanism.

Fig. 30 is a view illustrating the check ejecting mechanism and the operating means therefor.

Fig. 31 is a detail view of the feeding and retaining mechanism in the moved position, for the check ejecting mechanism shown in Fig. 30.

Fig. 32 is a view of the mechanism for operating the consecutive number and ribbon feed and the cam for driving the same.

Figure 16:
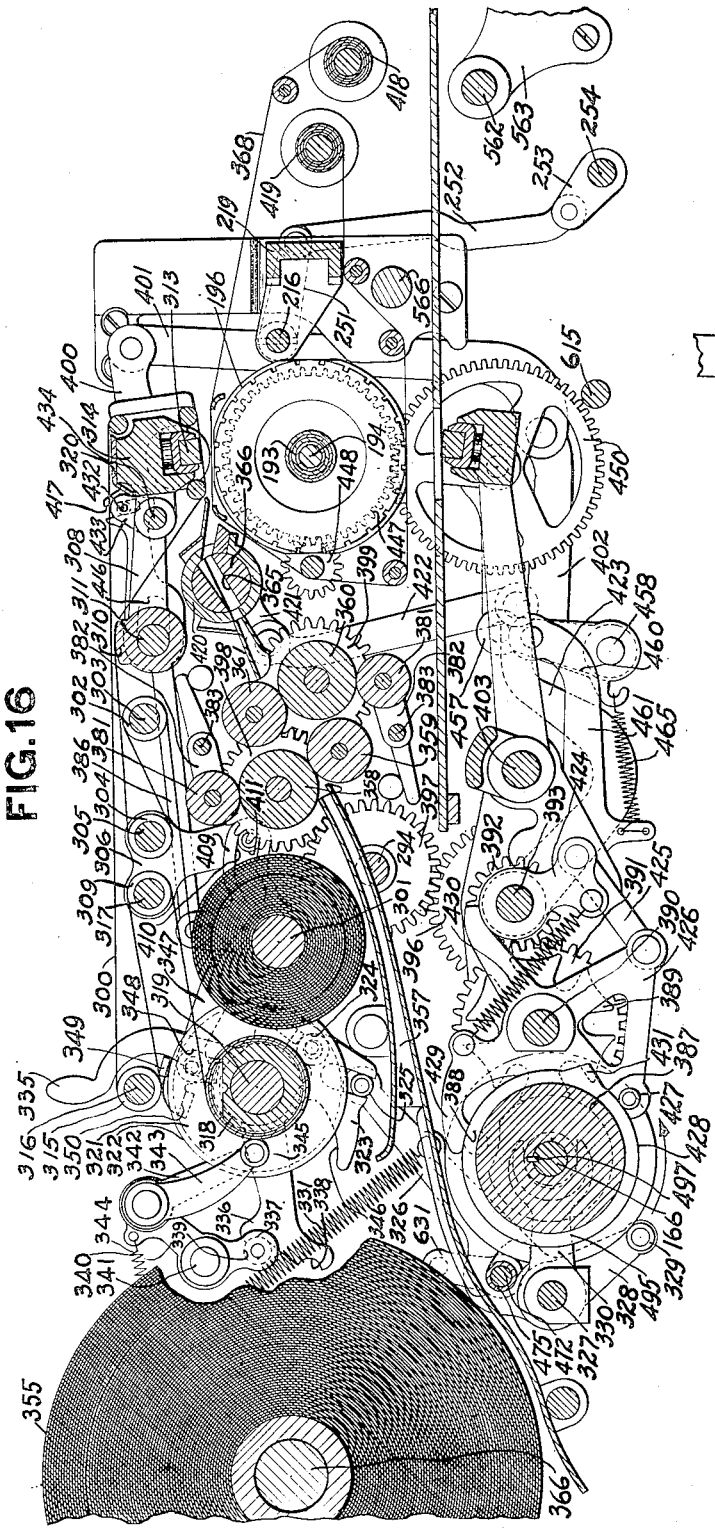
Fig. 16 is a vertical sectional view taken on line 16—16 of Fig. 12, looking in the direction indicated by the arrows.

For the purpose of illustration, the invention in the preferred form is shown applied to a machine of the type illustrated and described in the above mentioned patents of Frederick L. Fuller; but it is not intended to limit the use of this invention to these machines, as it is to be understood that the invention is susceptible of use with other types of accounting machines.

Described in general terms, the machine in the preferred form comprises a plurality of totalizers, one totalizer for each class of transactions, and one grand totalizer for accumulating the amounts received. These totalizers are operated by a differential mechanism controlled by manipulative means, such as banks of keys.

The differential mechanism provides means whereby the printing mechanism is set to print the amounts which are accumulated on the totalizer and also to print totals from said totalizers.

The printing mechanism comprises a type line having thereon amount type wheels, date type wheels and consecutive number type wheels. These type wheels are provided with two sets of numerals or characters, one set upon the upper half and one set upon the lower half thereof.

An impression mechanism is provided for taking two impressions from the upper set of type, one impression upon a check and one impression upon a detail strip.

An impression device is also provided to cooperate with the lower set of type wheels for taking two impressions upon an inserted slip.

Normally, a check is always issued upon the depression of the keys which represent the money taken in or paid out; in other words, "cash", "received on account" and "paid out" keys. If it is desired to issue a check upon the depression of any of the other transaction keys, such as "charge", "no sale", etc., the machine is provided with a manually operated knob, which, when turned to the "on" position, allows a check to be issued upon the depression of these keys. The mechanism is provided with an automatic check control, which issues a check upon the depression of the "cash", "received on account" or "paid out" keys regardless of the position in which the manually operated knob is set. In other words, if the knob is in the "off" position and the "cash", "received on account" or "paid out" keys are operated a check will be issued.

Upon the check is printed the date, consecutive number, clerk's initial, character of the transaction and the amount of the transaction. An electrocylinder is also provided for printing any other advertising matter upon the check which may be desired. The slip receives the same printing from the lower set of type as is printed upon the check from the upper set. Whenever a slip is printed, an "S" is printed upon both the slip and the check, and also upon the detail strip, which shows the proprietor when he examines the detail strip that a slip has been printed upon for certain transactions.

The detail strip receives impressions like the check and slip, except that the date is eliminated therefrom. Upon totalizing operations an "X" is printed upon the detail strip when a sub-total is taken, and a "Z" when a final total is taken from the totalizers.

*Operating mechanism.*

The motor mechanism which it is desired to use in connection with the present machine is of a well known type illustrated and described in Letters Patent of the United States, No. 1,144,418, granted to Charles F. Kettering and William A. Chryst, on June 29, 1915. For a detail description of the same, reference may be had to that patent. Only a part of the motor frame and the switch for the motor, and part of the clutch mechanism for the motor are shown in the accompanying drawings.

The motor is carried by a frame 50 mounted upon the left hand side frame 51 of the machine. A clutch member 52 forming one part of the clutch device, and shown in section in Fig. 1, is rotated through means (not shown) by the motor. A plate 53 forming another member of the clutch cooperates with rollers 54 loosely supported on studs on a plate 55 by means of which it is connected to the clutch member 52 upon release of the machine, as fully shown and described in the aforesaid Kettering and Chryst patent. This locking plate 55 is provided with a locking shoulder, which is engaged by the free end of a locking lever 56 pivoted to the side frame 51. The rear arm 57 of the lever 56 carries a roller which normally rests upon the upper edge of a curved portion 58 of an arm 59 fast on the outer end of a shaft 60. When the arm 59 is rocked counter-clockwise to release the machine, as will be hereinafter described, the locking lever 56 is rocked counterclockwise out of engagement with the shoulder on the plate 55 by a spring 61. The counterclockwise movement of the lever 56 is limited by a stud 62 carried by the frame 51. Upon the release of the lever 56, other plate members of the clutch (not shown) are moved by spring action. This movement of these plate members rocks a lever 63 pivotally mounted upon the frame 51, in a clockwise direction. The upper end of the lever 63 engages a roller 64 carried by an arm 65, mounted upon the motor frame, and rocks said arm clockwise, whereupon an insulated portion 66 of said arm moves a contact spring 67 into engagement with a contact point 68, thereby closing the circuit through the motor. The clutch member 53 is fast on a sleeve 69 mounted on a stud 70 projecting from the side frame 51. A gear 71 is fast on the sleeve 69 and meshes with an intermediate gear 72 mounted upon a stud 73 projecting from the frame 51. The gear 72 meshes with a gear 74 fast on a cam shaft 75 rotatably mounted in the left hand frame 51 and a right hand frame (not shown).

For the purpose of restoring the locking lever 56 to locking position near the end of the operation of the machine, a link 76 is pivotally connected at its upper end to the rearwardly extending portion 57 of the locking lever 56. The link 76 is provided with a slot 77 through which projects a pin on the frame 51 to guide the link in its reciprocation. The gear 72 is provided with a stud 78 which, near the end of the operation of the machine, engages a curved surface 79 of the link 76 and causes the link to be raised thereby moving the locking lever 56 back to its normal locking position.

As will be described later, the arm 59 is rocked back to its normal position just before the stud 78 passes out of engagement with the surface 79 of the link 76 in order to retain the locking lever 56 in its normal position.

Keyboard.

The machine for illustrative purposes may be provided with a keyboard comprising four banks of amount keys 80 (a side elevation of one of these banks is shown in Fig. 2), one transaction bank of keys 81 (Fig. 4), one clerks' bank of keys 82 (Figs. 3 and 4), and a total lever 83, which is employed to control the machine for total and subtotal printing operations. The construction of the key banks is substantially the same as that illustrated and described in the above mentioned Fuller Patent No. 1,394,256, and therefore but a brief description of the same will be given herein.

The keys of each bank are mounted in an individual frame 84 (Figs. 2, 3 and 4), mounted on cross rods 85, carried by the side frames of the machine. The amount keys 80 cooperate with key detents 86 and locking plates 87. The detents 86 are supported at their upper and lower ends respectively by arms 88 and 89 pivotally mounted on studs 90 carried by the frames 84. The keys are retained in their normal outward position by means of compression springs 91 which bear against pins 98 on the key shanks. When a key is depressed the inclined edge of the shoulder 92 engages a corresponding pin 93 on the detent 86 and moves said detent downward until the shoulder has passed the pin, whereupon the pin rises slightly and retains the key in its depressed position. The arm 89 engages a pin 94 on a zero stop pawl 95, which is normally in effective position, but when the detent 86 is moved downward, the pawl 95 is rocked clockwise to render it ineffective. A spring 96 stretched between the lower end of the pawl 95 and a pin on the frame 84 retains the pawl in its normal position. The locking plates 87 (Fig. 2) for the banks of amount keys are provided with extensions 97 which, upon the depression of a key 82 in the clerks' initial bank, to be hereinafter described, pass over the pins 98 of the depressed keys in the amount banks and under the pins 98 of the undepressed keys of the amount banks, thereby locking the keys in these banks which have been depressed, and rendering the keys which have not been depressed inoperable during the remaining part of the operation of the machine. In order to give the locking plate 87 the required upward movement, its upper supporting arm 99 is provided with a hooked portion 100, which engages the rod 101 carried by arms 102 fast on a rock shaft 60 (Figs. 2 and 3). This shaft 60 is rocked counter-clockwise upon the depression of any key 82 in the clerks' bank, as will be hereinafter described, whereupon the rod 101 lifts the locking plate 87 into the locking position.

The constructions of the transaction key bank and the clerks' key bank are substantially the same. The clerks' key bank, illustrated in Fig. 3, will be described but briefly, as both of these banks are similar to the banks illustrated and described in the above mentioned Fuller Patent No. 1,394,256.

The keys 82 are mounted in one of the frames 84 and are held in their normal outward position by means of springs (not shown). Each of the keys 82, except the "N" key, cooperates with a pin 104 carried by a detent 105, the lower end of which is pivotally mounted upon an arm 106, which in turn is pivotally mounted upon a stud 107 carried by the frame 84. The upper end of the detent 105 is pivotally mounted upon an arm (not shown) which is pivotally mounted upon a stud 108 carried by the frame 84.

The reason for the omission of a pin to cooperate with the "N" key will be hereinafter given in connection with the description of the totalizing operations.

Each key is provided with a pin 109, which cooperates with a slot 110 formed in a plate 111 the upper end of which is pivotally mounted upon an arm 112, which in turn is mounted upon the stud 108. The lower end of the plate 111 is mounted upon an arm (not shown), which in turn is mounted upon the stud 107.

The arm 112 (Fig. 3) carries a pin 113 projecting into a bifurcated arm 116 integral with a casting 117 loosely mounted upon a rod 118 carried by the side frames of the machine. Also integral with the casting 117 is a rearwardly extending arm 119, which engages a flattened pin 120 carried by an arm 121, loosely mounted upon the rock shaft 60, and having integral therewith an arm 122 the lower edge of which engages the rod 101, which, it will be remembered, is carried by the arms 102 which are fast upon the rock shaft 60.

From the foregoing description it will be readily seen that upon the depression of any key 82 the plate 111 will be moved downward thereby rocking the arm 112 in a counter-clockwise direction, which movement, through the engagement of the pin 113 and the arm 116 rocks said arm, the casting 117 and the arm 119 in a clockwise direction. This movement of the casting 117 disengages the arm 119 from the pin 120 thereby allowing the rock shaft 60 to be rocked in a counterclockwise direction under the influence of a spring (not shown). The mechanism for causing the shaft 60 to be rocked after it has been released from the arm 119 will not be described herein as this mechanism is fully illustrated and described in the above mentioned Fuller Patent No. 1,242,170.

It will be remembered that the arm 59 (Fig. 1) is fast upon the rock shaft 60, and from the above description it will be seen that when said shaft is released by the depression of any key in the clerks' bank it will cause the arm 59 to be rocked counterclockwise, and release the locking lever 56, so that the motor clutch may be operated to close the circuit and drive the mechanism.

*Differential mechanism.*

To drive the differential mechanism of the machine, the drive shaft 75 is provided with a plurality of pairs of cams 123 and 124, there being one pair of cams for each amount bank, one pair for the transaction bank, and one pair for the clerks' bank. Each pair of cams cooperates with rollers 125 and 126, respectively, carried by Y shaped levers 127 pivotally mounted at 128 on a companion frame 129 (Fig. 2) as is fully shown and described in the aforesaid Fuller patent. Loosely mounted on studs 130 carried by the frames 129, which support the differential units of the amount banks (Fig. 2), are differentially movable members 131 carrying racks 132 and transfer arms 133 for operating totalizer pinions 134 loosely mounted upon shafts 135 carried by the side frames of the machine. These totalizer pinions are substantially the same as those illustrated and described in the above mentioned Fuller Patent No. 1,242,170, and, as they form no part of this particular invention, it is not thought necessary to describe them herein.

The upper end of the Y-shaped levers 127 has pivotally mounted thereon the rear end of a link 136, the forward end of which is pivotally connected to a driving segment 137, loose on the stud 130. The driving segments 137 adjacent the banks of amount keys are connected to the differentially movable members 131 by latches 138, each of which is supported by an arm 139 and a lever 140 pivoted on the corresponding differentially movable member 131. Springs 141 hold the rear end of the latches 138 in engagement with the shoulders on the driving segments 137. When the segments 137 are driven by their cams 123 and 124, the differentially movable members 131 are carried with their latches upward until the forwardly extending portions of the levers 140 engage the depressed keys, whereupon the latches are disengaged from the driving segments and the forward end 142 of each latch 138 engages the notch 143, which is opposite the latch at the time the lever 140 engages the depressed key. The notches 143 are formed in plates 144 carried by the key frames 84. If a key is not depressed in an amount bank, the zero stop pawl 95 remains in its normal position and is engaged by the lever 140 to break the latch in the zero position. Upon the return movement of the driving segment 137 to normal position, said segment engages a pin 145, carried by the differentially movable member 131, and restores said member to its normal position.

The differential mechanism which cooperates with the clerks' bank of keys is similar to that used in connection with the amount banks, except that the differentially movable member 131 is omitted, and is replaced by an arm 146, loosely mounted upon the stud 130, and carrying the latch member for the clerks' bank. This differentially movable arm 146, and the latch mechanism therefor, are restored to their normal position upon return movement of the driving segment 137, for this bank, by the segment engaging a pin 147 carried by the differentially movable arm 146.

To each of the differentially movable members 131 and 146 is pivoted at 148 a beam 149 of the usual type, bifurcated at its rear end to surround a pin 150 carried by a link 151. A roller 152 carried by the Y-shaped lever 127 cooperates with the beam 149 in the usual way to position the bifurcated end of the beam commensurate with the positioning of the differentially movable members 131 and 146.

The upper end of each of the links 151 (it being understood that there is one link for each bank of keys) is pivoted to an arm 153 secured to an end of one of the nested sleeves 154, the other ends of which have secured thereon segmental members 155 (Fig. 2) for setting up the indicator. As the indicating mechanism forms no part of the invention herein described, there will be no further description thereof. The lower ends of the links 151 are pivotally mounted upon arms 156, loosely mounted on a rod 157, carried by the side frames of the machine. The arms 156 are connected by means of pins 158 to segments 159 also loose on the rod 157, for setting the type wheels corresponding to the keys depressed, as will be hereinafter described.

*Printing mechanism.*

The printing mechanism is located in front of the machine proper. The framework for this mechanism comprises a front frame 160, an intermediate frame 161 and a rear frame 162 (Figs. 2 and 12), all of which are mounted upon the base of the machine.

The entire printing mechanism is driven by the operation of the cash register. The shaft 75 (Figs. 2, 3 and 5), which is the main drive shaft for the registering mechanism, is provided near the left hand end of the machine with a spiral gear 163 (Fig. 5), which meshes with a spiral pinion 164 fast upon a sleeve 165 rotatably mounted upon the printer drive shaft 166. The front end of the shaft 166 is rotatably mounted in the front frame 160 and its rear end in a bracket 167 (Fig. 5) secured to the base of the machine. Integral with the sleeve 165 is a disk 168 upon which is pivotally mounted a driving pawl 169 and a retaining pawl 170 (Fig. 6), held in their normal position by a spring 171 stretched between the ends of the two pawls. Secured to the shaft 166 is a disk 172 provided with a boss 173, which is normally engaged by the driving pawl 169. The retaining pawl 170 normally rests against the true periphery of the disk 172 in a position so that there is a slight clearance (not shown) between said pawl and the boss 173 of said disk.

From the above description, it will be seen that when the parts are in the position as illustrated in Figs. 5 and 6, a clockwise rotation of the cam shaft 75 will cause a counter-clockwise rotation of the disk 168, and, consequently, through the engagement of the driving pawl 169 with the boss 173 fast in the shaft 172, said shaft will also receive a counter-clockwise rotation. The pawl 170 serves to retain the shaft 166 against any excessive overthrow movement.

Meshing with each of the segments 159 (Figs. 2 and 3), which are actuated by the movement of the differential mechanism, is a spiral gear 176 (Figs. 2, 3, 11 and 12) secured to a shaft 177 rotatably mounted in the intermediate frame 161 and a bracket 178 carried by the rear frame 162 of the printing mechanism. The shafts 177 are held against lateral movement by the hub of the gear 176 on one side of the bracket 178, and by a collar 179 secured to the shaft on the other side of the bracket. There is one spiral gear 176 associated with each of the amount banks, with the transaction bank, the clerks' bank, and the total lever 83. There is also one spiral gear 176 associated with the differential mechanism for the totalizer wheels of higher denominations than the amount banks. In this machine there are four such extra differential units; therefore, there are four extra spiral gears 176, making a total of eight spiral gears and eight differential units.

Secured to each of the shafts 177, except the one associated with the total lever, is a segment 180 (Fig. 18). Meshing with the segments 180 are teeth 181 formed on the underside of racks 182 which have slots 183 and 184 to receive rods 185 and 186, respectively (Figs. 12 and 18), carried by the frames 161 and 162. The racks are spaced laterally by plates 187 (Figs. 12 and 18) carried by the rod 185 and a rod 188 mounted in the frames 161 and 162. Each rack is provided with a clearance slot 189 for the rod 188. Only the foremost plate 187 is shown in Fig. 12 and this one is held in position by a collar 190 on the rod 185. The racks are spaced at each end by collars 197 (Fig. 18) on the rods 186.

Above each slot 189 the racks 182 are provided with another set of teeth 191, which mesh with gears 192 (Figs. 11, 18 and 22) fast upon ends of nested sleeves 193 mounted on a shaft 194, which has a bearing at one end in the frame 162 and at its other end in a hub 195 (Fig. 22). Secured to the other ends of the sleeves 193 are type wheels 196, there being eight amount type wheels, one transaction type wheel, and one clerks' type wheel.

From the above description it will be clear that the positioning of the segments 159 (Figs. 2 and 3), by the differential mechanism, moves the spiral gears 176 and segments 180, thereby positioning the racks 182, which in turn, through the teeth 191 and gears 192, set the type wheels 196 commensurate with the movement of the differential mechanism controlled by the depressed keys.

The type wheels 196 are of sufficient diameter to contain one set of type numerals or characters on the upper half of their peripheral edges and one set of type numerals or characters on the lower half of their peripheral edges. The upper set cooperates with an impression mechanism, to be hereafter described, for printing upon a check and a detail strip, and the lower set cooperates with another impression mechanism, to be later described, for printing upon an inserted slip or other paper.

As is usual in the art, there are provided totalizer wheels for which no banks of amount keys are employed, these elements being of highest denomination and operated in adding operations only when transfers to them are necessary. Differential units like those controlled by the amount keys are provided to actuate these totalizer elements of highest denomination and to position the type wheels of highest denomination during total and sub-total printing operations of the machine.

As before stated these totalizer elements are fully illustrated and described in the above mentioned Fuller Patent No. 1,242,170, therefore no description of them will be given herein.

The differential units cooperating with the highest order racks 182 are substantially the same as those illustrated in Fig. 2, therefore it is not necessary to give a description of them here.

All of the racks 182 associated with the amount key banks, transaction bank, the clerks' bank, and the higher order differential units are the same so far as the setting of the type wheels is concerned. There is however one rack 200 (Figs. 12 and 18) which is set by the movement of the total lever 83 so that during totalizing operations a letter will be printed to designate whether the amount printed is a sub-total or a final total. The driving connection between the total lever and the rack 200 comprises a nearly circular plate 201 (Fig. 7) integral with the total lever 83. This plate is identical with the one connected with the total lever illustrated in the above mentioned Fuller application, Patent No. 1,394,256, and performs practically the same functions in totalizing operations as described in the above mentioned application. This lever is loosely mounted upon a stud 202 carried by the right hand frame of the machine, and has pivotally mounted thereon the upper end of a link 203 the lower end of which is pivotally attached to an arm 204 loose upon the shaft 157. The arm 204 carries a pin 205 projecting into the segment 159 so that both the arm and segment will move in unison. This segment 159 meshes with the spiral gear 176 secured to the shaft 177 which is shown at the extreme right end of Figs. 12 and 18. Also mounted upon this shaft 177 is a segment 206 (Figs. 7 and 18) meshing with teeth 207 formed on the lower side of the rack 200. This rack 200 is supported by the rods 185 and 186. The rack 200 is also provided with a clearance slot 189 similar to the clearance slots of the other racks. Above this slot are the teeth 191 meshing with the gear 192 secured to one end of the innermost sleeve 193. Secured to the other end of this sleeve is a type wheel 208 having two sets of characters upon its peripheral edge. These characters are "X", which stands for a sub-total, and "Z," which stands for a final total.

From the above description it will be clear that when the total lever 83 (Fig. 4) is moved downward to the "Trans. total" or the "G. T. cash," that the plate 201 will be rocked counter-clockwise (as viewed in Fig. 7) thereby moving the link 203 upward and rocking the arm 204 and segment 159 connected thereto, in a counter-clockwise direction. This movement through the gear 176 and segment 206 moves the rack 200 and consequently the gear 192 meshing therewith, and positions the type wheel 208 so that a "Z" will be printed to represent a final total. When the lever 83 is moved upward to the "Trans. total" or "G. T. cash" position (Fig. 4), the plate 201 (Fig. 7) will be rocked in a clockwise direction thereby moving the link 203 downward and rocking the arm 204 and segment 205 in a clockwise direction, whereby the type wheel 208 is positioned to print an "X", which represents that a sub-total has been printed.

Also mounted upon the type line are four date wheels 209 (Fig. 22) carried by sleeves 210, which are connected by a mortise and tenon (not shown) to knurled hubs 211, which project outside of the cabinet of the machine and which are for the purpose of manually setting the date. The construction of the date wheels 209 and knurled hubs 211 will not be fully described herein as the same is fully illustrated and described in the above mentioned Fuller Patent No. 1,394,256. It is sufficient to state here that in order to set the date the operator pulls the hubs 211 outward in order that they may be grasped more conveniently and turned to the desired position, whereby through the sleeves 210 the date wheels 209 are set to print the date.

An aligning means is also provided for each of the date wheels to insure that they be set in the proper position for printing. This means comprises a pinion 215 (Fig. 25) meshing with each of the date wheels 209. These pinions are loosely mounted upon a shaft 216, and are engaged by spring pressed retaining pawls 217 loosely mounted upon a rod 218 carried by a bracket 219 secured to the intermediate frame 161.

From this description it will be seen that when the date wheels 209 are turned the pinions 215 will be rotated and will rock the pawls 217 as the teeth of the pinions 215 pass over the noses of the pawls. But the pawls will immediately be rocked backward by spring power and the nose will again assume a position between the teeth as illustrated in Fig. 25 thereby insuring that the type on the date wheels are in their proper alignment for printing.

An aligning mechanism is also provided which co-operates with the amount type wheels to insure that said type wheels will be properly aligned for printing. This aligning mechanism comprises, a series of pawls 220 (Figs. 11 and 18) loosely mounted upon eccentric hubs 221 integral with knurled disks 222 loose upon a rod 223 carried by the frames 161 and 162. The hubs 221 are eccentric with the rod 223 for the purpose of individually adjusting the pawls 220 to take up slight variations in manufacture or lost motion in the driving mechanism of the aforesaid pawls. The knurled disks are engaged by a thin plate 224, which through its engagement with the knurling on said disks holds them and the pawls in the positions to which they have been adjusted by the turning of said disks. The plate 224 is secured to a yoke 225 integral with parallel arms 226 (Fig. 18) and 227 (Fig. 11) also loosely mounted upon the rod 223. A rod 228 is carried by the arms 226 and 227 and acts as a stop for the pawls 220 when at rest. The arm 227 carries a laterally projecting stud 229 upon which is pivotally mounted the upper end of a link 230, the lower end of which is pivotally mounted upon an arm 231 loose on a stud 232 carried by the frame 162. Integral with the arm 231 is a Y-shaped arm 233 carrying the anti-friction rollers 234 and 235 which engage plates 236 and 237, respectively, of a double plate cam fast on the printer driving shaft 166.

From the foregoing description it will be readily seen that, after the type wheels have been positioned, a revolution of the shaft 166 and plates 236 and 237 will cause the arm 233, and consequently the arm 231, to be rocked in a counter-clockwise direction, whereby the link 230 is moved towards the right (Fig. 18) in the direction of its length, and rocks the arms 226 and 227, and consequently the pawls 220, until they become engaged with the gears 192. From the previous description it will be remembered that the gears 192 are secured to the sleeves which carry the type wheels 196, and therefore it can be seen that, when said gears 192 are aligned by the pawls 220, the type wheels will also be aligned in their proper position for printing. At the proper time, and after the printing has taken place, the plates 236 and 237 rock the arms 233 and 232 clockwise, to normal position, thereby moving the link 230 to normal position, and consequently, rocking the arms 226 and 227 clockwise to normal position, thereby releasing the pawls 220 from the gears 192.

The machine is also provided with a consecutive numbering mechanism which comprises five type wheels 240 (Figs. 13 and 32) loosely mounted upon the shaft 194 (Fig. 25). Secured to the side of each type wheel is a ratchet 241. Each of these ratchets 241 is provided with two deep recesses 242, which co-operate with the graduated tine of a rotation counter pawl 243, the construction of the ratchet wheels 241 and the differentially tined pawl 243 being of the usual well known rotation type. The ratchet wheels 241 are each provided with two recesses 242 because the type wheels are rotated by the pawl 243 twenty spaces, and during this complete rotation two transfers will take place. This construction is necessary for the reason that the type wheels themselves are provided with two sets of type, each having ten characters, the purpose of the two sets of type being to permit an impression to be taken from both the upper set and the lower set. It is to be understood that the upper set of type and the lower set of type correspond so that the same impression will be taken from both.

The differentially tined pawl 243 is pivotally mounted on a rod 246 carried by parallel arms 247 (Figs. 13 and 22) loose on the shaft 194. The tines of the pawl are held in engagement with the ratchets 241 by a torsion spring 248 (Fig. 22) wound around the rod 246 and having one end secured in one of the arms 247 and the other end pressed against the pawl 243.

Each arm 247 is provided with teeth 249 which mesh with segments 250 secured to the shaft 216. Also fast upon the shaft 216 is an arm 251 (Figs. 13 and 16), which has pivotally fastened thereto the upper end of a link 252, the lower end of which is pivotally secured to an arm 253 fast on a shaft 254 mounted in the frames 160 and 161. Also secured to the shaft 254 is an arm 257 (Figs. 12 and 32), which has pivotally fastened thereto one end of a link 258. The other end of the link 258 is U-shaped to surround the shaft 166, and carries an anti-friction roller 259, which operates in a cam race 260 in a disk 261 (Figs. 12 and 32) fast upon the shaft 166.

The configuration of the cam race 260 is such that during the rotation of the shaft 166 the link 258 will be moved first to the left (as viewed in Fig. 32) thereby rocking the arm 257, shaft 254 and arm 253 in a counter-clockwise direction. The counter-clockwise movement of the arm 253 moves the link 252 downwardly (Figs. 13 and 16) thereby rocking the arm 251 and consequently the shaft 216 in a clockwise direction, whereby the segments 250 are oscillated clockwise, and through their engagement with the teeth 249 on the arm 247 rock said arm counter-clockwise, thereby raising the pawl 243 upward a distance sufficient to cause it to turn the consecutive type wheel one step. During the latter part of the rotation of the shaft 166 the link 258 is moved to the right, thereby rocking the shaft 254 clockwise and causing the link 252 to be raised upwards to its normal position, whereby the shaft 216, segments 250, arms 247, and pawl 243 are oscillated to their normal position.

Means is provided for preventing any retrograde movement of the type wheels 240 when pawl 243 is lowered to its normal position. This means comprises retaining pawls 264 (Fig. 13) loosely mounted upon the shaft 216. These pawls are held in engagement with the ratchets 241 by means of compression springs 265, carried in the bracket 219, and which engage the under right hand end of the pawls.

The means for turning the consecutive numbering mechanism to zero is not illustrated and will not be described herein, as this mechanism is identical with that fully illustrated and described in the above mentioned Fuller Patent No. 1,394,256.

After the racks 182 have been positioned by the actuation of the differential actuators, as determined by the keys depressed in the various banks, and before an impression is taken by the type wheels associated with these racks, a mechanism is operated which is for the purpose of preventing the printing of cyphers to the left of the highest denomination represented by digit other than a cypher in any printed number or to the left of the units of dollars rack, and for the printing of cyphers to the right. This mechanism, known in the art as "zero elimination mechanism", will now be described.

Loose on a rod 266 (Fig. 18) carried by the frames 161 and 162, is an arm 267 carrying a pin 268 upon which are loosely mounted four arms 269 (Figs. 1, 11 and 18), each having a shoulder 270 adapted to engage a notch 271 formed in the several racks 182. The pin 268 also has mounted thereon an arm 272 having a shoulder 270 for cooperating with a notch 271 in the highest denomination rack 182. This rack is not shown in the "eliminated" position in Fig. 18 for reasons to be hereinafter described. Pivotally mounted on the arm 267 is the upper end of a link 282, the lower end of which is pivotally connected to the left end of a bell crank 283 loose on a rod 284 supported by the frames 161 and 162. Said bell crank is laterally positioned by sleeves 285 (Fig. 12). The left end of the bell crank 283 carries an anti-friction roller 286 which cooperates with a plate cam 287. The upper end of said bell crank carries an anti-friction roller 288 which cooperates with a plate cam 289. The plate cams 287 and 289 are fast to the shaft 166 and are secured to each other so that they form a double plate cam.

As stated above the four racks 182 which cooperate with the arms 269 are shown in the "eliminated" position. Upon rotation of the printer cam shaft 166 the bell crank 283 is rocked counter-clockwise thereby lowering the link 282 which causes the arm 267 to be rocked counter-clockwise. This movement of the arm 267 carries the arms 269 towards the right (Fig. 18) until a portion 290 of said arms strikes the collar 275, whereupon the arms 269 are rocked counter-clockwise thereby disengaging the shoulders 270 from the notches 271.

After the arms 269 have been released from the racks 182 and said racks have been restored to the zero position they are differentially positioned under the control of the depressed keys by means of the segments 180, as previously described. When said racks are so moved to the right a portion 295 of the arms 269 rides on the surface 296 of the racks 182 thereby holding the arm in raised position. A portion 297 (Figs. 1 and 18) of each of the arms 269 is bent over so that it lies in the plane of the adjacent arm on the left (as viewed in Fig. 1). From this construction it can be seen that, when the amount registered is large enough to cause, for instance, the sixth rack 182 commencing with the units (Fig. 12) to be positioned, the arm 269 cooperating with the sixth rack is raised and held in the raised position by the edge 296 so that it engages the portion 297 (Figs. 1 and 18) of the fifth arm, thereby holding said fifth arm in the raised position. The fifth arm engages the bent portion 297 of the fourth arm and holds it in the raised position, and so on towards the right. From this it can be seen that, should the amount be $3000.00, for instance, all of the zeros would be printed because the portion 297 of the arm 269 cooperating with the sixth rack, or in other words the rack which sets up the figure 3, engages the arm to the right (Fig. 1), and it in turn engages the arm to its right, and so on; thereby holding those arms 269 up so that the shoulder 270 cannot engage the notch 271 in these racks. However, the seventh and the eighth racks, not being involved in the amount, will remain in the zero position, whereupon during the rotation of the shaft 166 the cams 287 and 289 rock the bell crank 283 clockwise thereby raising the link 282 and rocking the arm 267 clockwise. This movement of the arm 267 allows the arm 269 associated with the seventh rack and the arm 272 associated with the eighth rack to be rocked clockwise, whereby their shoulders 270 engage the notches 271 in the seventh and eighth racks and move said racks to the left one space (to the position in which they are shown in Fig. 18), whereby the type wheels are moved from a zero position to a position whereby dashes will be printed to the left of the number 3000.00 instead of two zeros. Under certain conditions which will be hereinafter described in connection with the printing upon a slip, the arm 272 is rendered inoperative. When the racks 182 are moved to the "eliminate" position by the arms 269 and 273, a hook portion 298 integral with the racks engages a portion 299 formed on the segments 180 thereby locking the segments and consequently the differential mechanism associated therewith in this position.

*Detail strip feeding mechanism.*

The detail strip 300 is fed from a supply roll mounted upon a shaft 301, around a roller 302 (Figs. 8, 11, 13 and 16) mounted on a stud 303 carried by the printer frame 161, and around a roller 304 mounted on a stud 305 carried by the upper end of a lever 306 loose on a shaft 294. From the roller 304 the strip is passed to the right over a casting 310 loose on a rod 311 carried by a frame 161 and supported at its outer end by a plate 312 secured to the bracket 219. From the casting 310 the strip is fed to the right under a platen 313 carried in a block 314, up and over the top of said block to the left over a roller 315 mounted on a rod 316 carried by the frame 161. The block 314 has integral therewith two arms 307 and 308 which are also integral with the casting 310. From the roller 315 the strip is passed around a roller 309 loose on a rod 317 mounted upon the lever 306, and from said roller 309 is wound upon a receiving roll 318 loose on a stud 319 carried by the frame 161. Secured to the top of the block 314 is a plate 320 which acts as a writing table so that autographic notations may be made on the detail strip whenever desired. This construction is substantially that disclosed in the above mentioned Fuller Patent No. 1,394,256.

The receiving roll 318 has secured thereto a disk 321 (Figs. 11, 13 and 16) provided with a flange 322. Loose on the stud 319 is an arm 323 carrying a spring pressed roller 324 which cooperates with the inside of the flange 322. The arm 323 is provided with a slot which engages with a pin 325 carried by an arm 326 loose on a rod 327 carried by the frames 160 and 161. Secured to the arm 326 by means of a hub is an arm 328 carrying a roller 329 which rests against the periphery of a disk 330 (Figs. 12 and 16) fast on the shaft 166, and is held in this position by means of a spring 331 stretched between the arm 326 and a pin (not shown) carried by the frame 161. The periphery of the disk 330 is so shaped that when the cam shaft 166 is rotated the roller 329 will move toward the center of said shaft under the influence of the spring 331 thereby rocking the arms 328 and 326 counter-clockwise and through the pin 325 and slot in the arm 323 move said arm clockwise. Immediately after the arm 326 has received its full counter-clockwise movement the disk 330 rocks the arm 328 clockwise thereby rocking the arm 323 in a counter-clockwise direction, whereby the roller 324 grips the inner surface of the flange 322 and consequently rotates the disk 321 and the receiving roll 318 in a counter-clockwise direction, thus feeding the detail strip and leaving it in a position for subsequent operation of the machine.

The length of the feed of the detail strip may be varied according to whether or not it is desired to make autographic notations thereupon. The parts as shown in Figs. 13 and 16 are in a position to feed the strip a distance sufficient to leave room for autographic notations between the records upon said strip. If the autographic feature is not desired the operator grips the lever 335 and moves the same towards the right. This lever is loose upon the rod 319 and has integral therewith an arm 336 provided with two curved recesses 337 and 338. The recess 337 is shown in engagement with a pin 339 carried by the lower end of a bell crank 340 loose on a stud 341 carried by the frame 161. The upper end of the bell crank 340 has pivotally mounted thereon two arms 342 and 343. These arms are fast to each other, and are held in the position shown in Fig. 16 by a spring 344. The arm 343 carries a roller 345 which rests against the detail strip which has been wound upon the receiving roll and acts as a retainer for said strip. This arm 342 is in the same plane as lever 323 (Fig. 1) and limits the throw of the lever 323 and thereby determines the length of the feed when the arm 323 is rocked by the arm 326 to feed the detail strip. When the lever 335 is moved to the right, as just stated, the arm 336 is rocked clockwise thereby causing the recess 338 to engage the stud 339 carried by the bell crank 340. This movement of the arm 336 also moves said bell crank clockwise thereby causing the arms 342 and 343 to be lowered. Now, when the arm 323 is rocked by the arm 326 to feed the detail strip, its edge 346 will engage the arm 342 thereby stopping said arm 323 from further movement, which has the effect of causing the roller 324 to grip the flange 322, whereby upon return movement of the arm 323 the receiving roll is rotated a shorter distance than as described before.

The receiving roll is prevented from any retrograde movement by means of an arm 347 loose on the rod 301. This arm carries a spring pressed roller 348 and also has integral therewith two formed portions 349 and 350 which engage the outer and the inner edges respectively, of the flange 322, to hold the arm in position. From this it can be seen that when the disk 321 is rotated counter-clockwise the roller 348 is loose and does not bind against the flange 322. However, should the clockwise movement of the arm 323 tend to rotate the disk 321 in the same direction, the roller 348 binds against the inner surface of the flange 322, thereby locking the disk and preventing any movement of the disk in a clockwise direction.

After the impression has been taken, the detail strip is shifted to the position in which it is shown in Figs. 13 and 16, so that the last amount printed will be visible to the operator, and it will then be in a position substantially the same as that to which the detail strip is shifted in the above mentioned Fuller Patent No. 1,394,256 whereby autographic notations may be made upon said detail strip under the last printed record. The means for shifting the detail strip is substantially the same as that disclosed in this patent, and therefore it is not thought necessary to go into any detailed description thereof herein, it being sufficient to state that before the impression on the detail strip is made the lever 306 is moved to the left (Figs. 13 and 16) thereby causing a slack of the paper between the rollers 309 and 315. This slack is immediately taken up between the roller 304 and the platen 313 due to the fact that said roller 304 moves with the lever 306 when said lever is moved to the left.

The distance the paper is shifted is sufficient to position the last print the proper distance from the platen so that the new print will be in its proper relation thereto.

A fragmentary portion of the detail strip as printed by the machine is illustrated in Fig. 28. The left hand column of figures represents the consecutive number. In the first five items the first letter represents the clerk, the next word or letters represent the transaction, and the next letter, where one appears, represents that a slip was printed for that particular operation. The next column of figures represents the amount of the transaction. The sixth and seventh items represent total printing operations, the first where the "X" appears represents a subtotal operation, and the next where a "Z" appears represents a total printing operation. The autographic feature is also illustrated in this figure.

Check feeding mechanism.

The paper from which the checks are printed, cut and ejected from the machine, is in a supply roll 355 (Figs. 1, 8, 11, 13 and 16), which is loosely mounted upon a stud 366 carried by a bracket (not shown) secured to the frame 161. The paper is fed from the bottom of the roll through a chute 357 (Figs. 13 and 16), between an electro roll 358 and an impression roll 359, between another electro roll 360 and an impression roll 361, through another paper chute 362, and thence through an opening 365 in a rotary knife 366. After passing through the knife the paper strikes a deflecting plate 367 and is deflected so that it passes between a ribbon 368 and the detail strip 300 underneath the platen 313.

In Figs. 13 and 16 the impression rolls 359 and 361 are shown in engagement with their respective electro rolls 358 and 360. When the paper is fed through the chute and between these rolls, as just described, the operator grips the pinch lever 370 (Fig. 8) which is mounted upon an arm 371 thereby rocking said lever clockwise and releasing its portion 372 from a notch in a plate 375. The arm 371 may then be rotated clockwise. Integral with the arm 371 is a segment 376 meshing with a segment 377 and a segment 378 fast upon the shafts upon which the impression rolls 361 and 359 are mounted eccentrically. The impression rolls being mounted eccentrically with respect to the segments 377 and 378, when said segments are rotated by means of the segment 376 through the movement of the arm 371 the impression rolls 359 and 361 will be moved away from their respective electro rolls thereby leaving plenty of room to feed the paper therebetween.

The means for inking the electro rolls 358 and 360 comprises two rolls 381 (Figs. 11, 13 and 16) each carried by parallel arms 382 loose on rods 383 supported by the frame 161 on the plate 375. The rolls 381 are held in engagement with the electro rolls by means of springs 384 (Fig. 11) wound around the rods 383 and having their center portion fastened to said rod and the ends bearing against the arms 382.

The power for rotating the electro rolls 358 and 360 for feeding the check is derived from shaft 166. A disk 387 (Figs. 12, 16 and 29) fast on this shaft carries a pin 388 which cooperates with a Geneva plate 389 loose on a shaft 390, carried by the frames 160 and 161. Secured to the Geneva plate 389 is a gear 391 meshing with a gear 392 loose on a shaft 393 rotatably mounted in the frames 160 and 161. Also loose on the shaft 393 is a gear 396 meshing with a gear 397 loose on the shaft 294. The gears 392 and 396 are secured to a sleeve 394 so that they move in unison. The gear 397 meshes with a gear 398 fast to the electro roll 358. The gear 398 in turn meshes with a gear 399 fast to the electro roll 360. Thus when the shaft 166 is rotated counterclockwise (Figs. 13 and 16) motion is transmitted to the electros 358 and 360, respectively. The electro 358 prints on the back of the check and the electro 360 prints on the face of the check. A sample of the check is illustrated in Fig. 27.

Detail and check printing mechanism.

Figure 17:
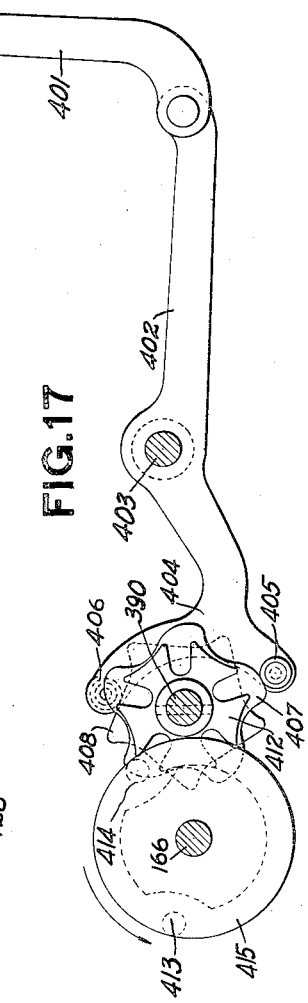
Fig. 17 is a detail view of the upper impression operating mechanism.

The means for operating the platen 313 to take an impression from the type wheels upon the detail strip and the check will now be described. An arm 400 is secured to the arm 308 and casting 310. To the outer end of this arm is pivotally fastened the upper end of a link 401 (Figs. 16 and 17) the lower end of which is pivoted to a lever 402 loose on a shaft 403 carried by the frames 160 and 161. Integral with the lever 402 is a Y-shaped arm 404 carrying two anti-friction rollers 405 and 406 which cooperate with cams 407 and 408, respectively, fast on the shaft 390. Also fast to the shaft 390 is a Geneva plate 412 which cooperates with pins 413 and 414 carried by a disk 415 fast on the shaft 166. The pin 413 is somewhat longer than the pin 414 for reasons to be hereafter given. Upon rotation of the shaft 166, first the pin 413 engages the Geneva plate 412 and turns said plate and the cams 407 and 408 in a clockwise direction, whereby the Y-shaped arm 404 and the lever 402 are rocked clockwise thereby lowering the link 401, and rocking the lever 400 and consequently the housing 314 a distance sufficient to cause the platen 313 to make an impression against the type wheels, whereby the amount, transaction, clerk's initial, and consecutive number are printed upon the detail strip. Immediately after the impression the cams 407 and 408 cause the arm 404 and the lever 402 to be rocked counter-clockwise thereby raising the platen 313 away from the type wheels. At this time the feeding mechanism for the check previously described, is operated and the check is fed to a position to receive an impression from the type wheels. After the feeding of the check the pin 414 engages the Geneva plate 412 and rocks the platen in identically the same manner as the pin 413 thereby causing the platen 313 to make another impression, whereby the date, consecutive number and the amount, transaction, clerk's initial, are printed upon the check.

It is not desired that an impression should be taken from the date type wheels upon the detail strip, and as a consequence the detail strip is made narrower than the check strip, there being no portion of the detail strip above the date type wheels. However, it is both desirable and imperative that an impression should be taken from them upon the check paper. Since the detail strip is printed in advance of the check paper, mechanism is provided for preventing a portion of the upper platen 313 from engaging the ribbon above the date wheels, this portion of the platen only cooperating with the check paper. This mechanism will now be described.

A Y-shaped arm 409 (Fig. 16) is loose on the rod 301. The right hand portion is provided with a slot 410 which engages a roller 411 carried by the lever 306. The upper portion of the arm 409 is pivoted to one end of a link 386 which is provided with a slot 416 for surrounding the rod 311. The right hand end of the link is provided with another slot 417, which engages a pin 432 carried by an arm 433 fast on one end of a shaft 434 mounted in the arms 307 and 308. The other end of the shaft 434 (Figs. 23 and 24) has fast thereto an arm 435 carrying a pin 436 which engages a slot 437 in a link 438 supported on the rod 311 and the shaft 434. The link 438 is provided with a cam slot 439, which engages a pin 440 carried by one end of a lever 441 loosely mounted on the shaft 434. The other end of the lever 441 projects into a portion 442 of a platen-carrying member within the housing 314 directly above the date type wheels.

From the above description it can be seen that when the lever 306 is moved to the left (Fig. 16) the roller 411 through the slot 410 will cause the Y-shaped arm 409 to be rocked counter-clockwise, thereby moving the link 386 to the left. This movement of the link 386 through its engagement with the pin 432 rocks the arm 433, shaft 434 and arm 435 counter-clockwise (Figs. 16 and 24), thereby moving the link 438 upward (as viewed in Fig. 24), whereby the cam slot 439 through the pin 440 rocks the lever 441 counter-clockwise thereby raising the portion 442 of the platen carrying member, so that when the arm 400 is rocked to cause the platen to take an impression the first time, which is upon the detail strip, this portion 442 of the platen carrying member will be elevated a distance sufficient to permit a clearance between said portion and the date type wheels so that no impression will be taken therefrom.

The means for inking the type wheels for taking the above mentioned impressions is the ribbon 368, previously mentioned, which is wound from a roll 418 and passed around the type wheels and on to a roll 419 or vice versa. The means for the inking of the type wheels is not a part of the present invention, and any well known form of ribbon feeding mechanism may be used to accomplish the feeding of said ribbon.

*Cutting mechanism.*

After the check has been printed upon, the knife 366 is rotated within the housing 420 to cut the printed check from the check strip. The means for rotating the knife comprises an arm 421 (Figs. 13 and 16) secured to the knife 366. Pivotally connected to the arm 421 is the upper end of a link 422, the lower end of which is pivotally mounted upon an arm 423 fast upon the shaft 393. Also fast on the shaft 393 is an arm 424, which has pivotally secured thereto one end of a link 425, the other end of which is pivoted to a member 426 loose on the shaft 390. The member 426 carries an anti-friction roller 427 which cooperates with a cam 428 secured to the cam disk 387. The member 426 is provided with an arm 429 which normally engages the pin 388. A spring 430 stretched between the upper portion of the member 426 and the arm 424 holds the member 426 in the normal position.

Upon rotation of the shaft 166 a portion 431 of the disk 428 engages the roller 427 and rocks the member 426 counter-clockwise, whereby through the link 425, the arm 424, shaft 393 and arm 423 are rocked counter-clockwise thereby raising the link 422 and rotating the knife 366 clockwise. Immediately after the roller 427 passes the high point of the portion 431 the pin 388 engages the underside of the arm 429 thereby rocking the member 426 clockwise to normal position. This movement through the link 425 rocks the arm 424, shaft 393 and arm 423 clockwise, thereby lowering the link 422 and rotating the knife 366 to normal position.

Check ejector mechanism.

Immediately after the check has been severed from the check paper a mechanism is operated whereby the severed portion or check is ejected from the machine, so that the clerk may give the same to the customer. This mechanism comprises two eccentrically mounted knurled rollers 445 (Fig. 22). One of the rollers 445 is carried by the plate 312 and the other is carried by a bracket secured to the frame 161. These rollers cooperate with knurled disks 446 (Figs. 22 and 30) each having secured to the side thereof a gear 447. The disks 446 are each provided with four flat surfaces on their peripheries, one of which is always normally beneath the rollers 445, in the home position, so that the check paper may be fed between said rollers and said disks. Meshing with the gears 447 are pinions 448 fast on a shaft 449 carried by the frame 161 and the plate 375. Meshing with the right hand gear 447 (as viewed in Fig. 22) is a gear 450 (Fig. 30) loose on a stud 451 carried by the frame 161. Fast to the side of the gear 450 are two ratchets 452 and 453. A pitman 456 has one end pivotally mounted upon the upper end of an arm 457 loose on a stud 458 carried by the side frame 161. The forward end of the pitman is bifurcated to surround the stud 451. Pivotally mounted upon said pitman is a pawl 459 which cooperates with the ratchet 452. The arm 457 is hubbed to another arm 460 which has pivotally fastened thereto one end of a link 461, the other end of which is curved to surround the hub of a disk 462 fast to the printer cam shaft 166. The curved end of the link 461 carries an anti-friction roller 463 which cooperates with a cam race 464 formed in the side of a disk 462. In Fig. 30 the parts just described are shown in the normal position. Upon counter-clockwise rotation of the shaft 166 the link 461 is moved to the left thereby rocking the arms 460 and 457, whereby the pitman 456 is moved to the left. When this pitman has reached its extreme left position, the pawl 459 is in the position shown in Fig. 31 ready to engage the ratchet 452 as soon as the pitman is moved to the right. A spring 465 is stretched between the link 461 and a hook integral with the arm 457. Near the end of the rotation of the shaft 166, and after the check has been severed from the check strip, the cam race 464 turns abruptly towards the center of the shaft. This with the help of the spring 465 moves the link 461 to the right very rapidly, whereby the pawl 459 engages the ratchet 452 and turns said ratchet one tooth in a counter-clockwise direction. A pawl 466 integral with the pawl 459 is so positioned that it also engages the ratchet 452 thereby preventing any overthrow of said ratchet. The turning of the ratchet 452 causes the gear 450 to be turned counter-clockwise, thereby rotating the right hand gear 447 (Figs. 22 and 30.) clockwise, and through the pinions 448 turns the left hand gear 447 (Fig. 22) clockwise a distance sufficient to turn the disks 446 ninety degrees (90°) or one-quarter of a full revolution. During this movement of the disks 446 the true peripheries of said disks engage the check and press it against the rollers 445, whereby the check is quickly ejected from the machine.

During the movement of the pitman 456 to the left preparatory to advancing the ratchets 452 and 453 counter-clockwise, said ratchets are kept from any movement in a clockwise direction by means of a spring pressed retaining pawl 467 mounted on a stud 468 carried by the frame 161 (Fig. 31).

Control for check issuing mechanism.

When registering certain classes of transactions it is desired that no check shall be issued; therefore, the machine is provided with a manually operated mechanism whereby the means for operating the check feeding mechanism is disabled at will during these operations. In other words, according to the system being described, no check is to be issued on a "no sale" or "charge" transaction; but on a "cash," "received on account" or "paid out" transaction a check is to be issued. For the first two mentioned transactions a manually operated knob is turned to the "off" position, whereby the mechanism for operating the check feeding mechanism is crippled. For "cash," "received on account" and "paid out" transactions said manually operated knob is turned to the "on" position, whereby the operating mechanism for the check feeding mechanism is operated. If a "charge" transaction has been registered in the machine and the next operation should be a "cash" operation, and the operator should forget to turn the manually operated knob from the "off" to the "on" position, and if there were no means for controlling the operating means for the check feeding mechanism, there would be no check issued on a "cash" operation; therefore, the machine is provided with an automatic device, which, whenever the "cash," "received on account" or "paid out" keys are depressed causes a check to be issued regardless of the position of the manual control knob. These devices for the manual control and the automatic control of the check will now be described.

Loose on the end of a shaft 472 is a knob 474 having secured thereto a yoke 473 (Figs. 1, 19 and 20). The shaft 472 is mounted within a sleeve 475 rotatably mounted in the side frames 160 and 161. The sleeve 475 is also fast to the yoke 473, the knob and sleeve thus being made to move in unison. The other end of the sleeve has secured thereto an arm 476. The knob 474 is provided with two flat surfaces, one surface having inscribed thereon the word "on" and the other surface having the word "off." In Figs. 1, 19 and 20 the knob is shown in a position with "on" on top so that no matter what the transaction should be a check would be issued. The arm 476 cooperates with a portion 477 of a lever 478, which is pivotally mounted upon a stud 479 carried by an arm 480, which in turn is pivoted at 481 to the side frame 51. Pivotally mounted on the frame 162 at 482 is an arm 483, which (when the knob is in the "on" position, as shown in Fig. 1) engages a pin 484 carried by the shaft 327 previously described. The arm 483 is held in this position by a spring 485 stretched between said arm and the lever 478. A pin 486 carried by the arm 483 engages the upper edge 471 of the lever 478 when the arm 483 is in engagement with the pin 484. The portion 477 of the lever 478 is held in engagement with the arm 476 by means of a spring 487 stretched between an upwardly extending arm of the lever 478 and a pitman 488 pivotally fastened to the stud 479. The pitman 488 is provided with a slot 489 intermediate its ends into which projects a pin 490 carried by the side frame 51. The left hand end of the pitman (Fig. 1) is bifurcated to surround the hub of the gear 74. The pitman carries an antifriction roller 491 which cooperates with a cam race 492 formed in the side of the gear 74.

This cam race is so designed that at the beginning of the operation of the machine the pitman 488 will be moved towards the left (Fig. 1) and will carry lever 478 with it. As this movement continues, a flat surface on said lever will come into contact with stud 481 and the lever 478 will be rocked clockwise. If, at the last operation, the lever 478 engaged the pin 484 the above described movement will disengage the lever 478 from pin 484. The various controls are then adjusted and when the pitman 488 moves again towards the right the lever 478 will again move into engagement with the pin 484, or such engagement will be prevented, depending on whether or not a check is to be issued. Fast upon the shaft 327 (Figs. 1 and 16) is an arm 495. The arm 495 is bifurcated to engage an annular groove 496 (Fig. 12), formed in the hub of the disk 387, previously described in connection with the check feeding mechanism. The disks 387 and 415 are integral and are slidably mounted upon the cam shaft 166, so as to move the pin 388 which drives the check feeding mechanism and the short pin 414, which is one of the pins for driving the upper impression mechanism, out of operative position. However the disks 387 and 415 are made to rotate with the shaft by means of a key 497 (Fig. 16) which fits within a groove in the shaft 166 and a groove in the hubs of the disks, just mentioned.

When the parts are in the position illustrated in Figs. 1 and 12, the pins 413 and 414 carried by the disk 415 are both in position to engage and operate a Geneva plate 412 (Figs. 12 and 17) which operates the upper impression mechanism, so that two impressions will be made, one upon the detail strip, and one upon the check; and the pin 388 carried by the disk 387 is also in a position to engage and operate the Geneva plate 389 which drives the gear for operating the check feeding mechanism. When the shaft 75 is rotated, and the parts are in the position shown in Fig. 1, the pitman 488 when moved toward the left by the cam race 492 causes the lever 478 to slide along with its portion 477 resting against the arm 476, and the lever has no effect upon the shaft 327; so that during the operation of the machine a check will be issued and two impressions will be taken from the upper impression mechanism.

A portion 498 (Fig. 1) of the lever 478 cooperates also with a portion 499 (Figs. 11, 12 and 21) of an arm 500, loose on a rod 501, carried by the frames 161 and 162. Also loose on the rod 501 is an arm 502. The arms 500 and 502 are made integral by a yoke 503 which cooperates with notches 504 and high portions 505, of the extreme left hand portion of that rack 182 which is associated with the transaction bank of keys.

When the machine has been operated and a check issued, and it is desired at the next operation of the machine to have no check issued on a "no sale" or "charge" transaction, the knob 474 is turned clockwise (Fig. 20) so that the "off" inscription will occupy a position now occupied by the "on" inscription. The turning of the knob also turns the arm 476 clockwise (Fig. 20), thereby disengaging it from the portion 477 of the lever 478. When the machine is now operated and the pitman 488 and lever 478 moved to the left, as soon as the pin 484 is above the notch 506 in the lever 478, said lever is rocked counter-clockwise under the influence of the spring 487. The pitman 488 is then moved to the right by the cam race 492, whereby the notch 506, through the pin 484, causes the shaft 327 and the arm 495 fast thereto, to be moved to the right (Fig. 1) towards the frame 160 (Fig. 12), thereby shifting the disks 387 and 415 towards the frame 160, so that the pins 414 and 388 will be out of operative relation with the Geneva disks 412 and 389, respectively. The pin 413 being of such length as not to be moved out of operating position is now the only pin which will operate the Geneva plate 412 and only one impression will be taken from the upper impression mechanism, and this impression is for the detail strip. The pin 388 being moved out of cooperative relation with the Geneva plate 389, of course said plate will not be operated, and, therefore, the check feeding mechanism will not be operated when either the "no sale" or the "charge" key is depressed. If a "no sale" key is depressed, the rack 182 for the transaction bank will be moved so that the extreme left hand notch 504 will be positioned beneath the yoke 503 (Fig. 21). If the "charge" key is depressed, the middle notch will be positioned beneath the yoke 503. With the rack in position so that any one of the notches cooperates with the yoke 503, it can be seen that the portion 499 of the arm 500 will not interfere with the counter-clockwise rocking of the lever 478 (Fig. 1), whereby the notch 506 is allowed to engage the pin 484 on the shaft 327, so that when the pitman 488 is moved to the right the shaft 327 will be shifted whereby the check feeding mechanism and one of the upper impressions are disabled. When the knob 474 is turned to the "on" position, which is the position shown in the drawings, and the arm 476 moved so that it engages the portion 477 of the lever 478, it can be seen that said lever cannot be rocked counter-clockwise, and therefore, the notch 506 never can engage the pin 484. Therefore, with the knob turned in the "on" position, a check will always be issued, regardless of what the character of the transaction is.

Assuming that the machine has been operated for a charge transaction with the knob turned in the "off" position, and the next operation is, say, a "cash" operation, and that it is desired to issue a check with the "cash" operation, means is provided which operates automatically so that should the operator forget to turn the knob from the "off" to the "on" position, the machine will automatically cause the shaft 327 to be shifted to the proper position for feeding the check strip and causing two impressions to be taken from the upper impression mechanism. This mechanism comprises substantially the same mechanism as just described in the manual check control, except that the knob is not used and the shifting of the shaft 327 is controlled by the high portions 505 of the transaction rack 182. For example, should the knob 474 be left in the "off" position and the "cash" key depressed, the rack 182 would be shifted so that the portion 505 between the two left hand notches would be moved directly beneath the yoke 503 and thereby move the yoke upward and rock the arms 502 and 500 counter-clockwise, thereby moving the portion 499 of the arm 500 so that it will engage the portion 498 of the lever 478. With the portion 499 in engagement with the portion 498, it can be seen that when the pitman 488 is moved to the left, and the lever 478 moved therewith, that said lever will engage the pin 484 which was left in a position to the right of that shown in Fig. 1, and move said pin and the shaft 327 to the position shown; thereby shifting the disks 387 and 415 to the left, so that the pins 413 and 414 both operate the Geneva plate 412, and so that the pin 388 operates the Geneva plate 389.

Means is provided for holding the knob 474 either in the "off" or in the "on" position after the machine has been started. This means comprises an arm 509, (Fig. 9) fast on the sleeve 475, which cooperates with the periphery of the disk 261, and is so formed that when the shaft 166 begins to rotate the true periphery of said disk engages the arm 509 and prevents it and the sleeve 475, and consequently the arm 474 from being rocked from one position to another. In the normal position of the disk 261 the arm 509 may be rocked as said disk is provided with a notch deep enough to swing the arm 509 so that said knob may be set in either of its two positions. If the knob is not set exactly to the position desired, the disk 261 engages the arm 509 and causes the knob to be set to the position nearest to which it is set at the time of the beginning of the operation of the shaft 166.

*Slip feeding mechanism.*

The machine is designed for printing upon an inserted slip or other paper substantially like the sample slip illustrated in Fig. 26. This slip is placed upon a table 512 (Fig. 11) with the lower and left hand edges approximately on the lines 513 and 514 respectively, before the machine is operated. Means is provided whereby the slip is automatically placed in proper position to receive a first impression, then advanced to receive a second impression, and finally ejected from the machine. The mechanism for placing the slip in the proper position to receive the first impression will be described first.

This mechanism comprises, a knurled drum 515 (Figs. 8 and 10) having two flat surfaces 516 and 517 on its periphery. The drum 515 is mounted on a stud 518 carried by a bracket 519 (Fig. 12) mounted on the frame 160 in a position so that said drum is at right angles with said frame. Also mounted on the stud 518, and secured to the drum 515, is a gear 520, which meshes with a gear 521 fast on a shaft 522 carried by brackets 523 and 524 and secured to the frame 160. Also fast to the shaft 522 is a spiral gear 525 (Figs. 8, 9 and 12) which meshes with another spiral gear 526 (Fig. 1) fast on one end of a sleeve 527 loose on the shaft 390. Fast on the other end of the sleeve 527 is a pinion 528 (Fig. 9) meshing with a segment 529 loose on the shaft 166. The segment 529 has pivotally fastened thereto one end of a link 530, the other end of which is pivotally fastened to an arm 531 loosely mounted on the sleeve 475, which is on the shaft 472. The arm 531 carries an anti-friction roller 532, which cooperates with a cam race 533 in the side of the disk 261.

Cooperating with the drum 515 is a yieldingly held knurled roller 537, loosely mounted on a pin 538 carried by parallel arms 539 (Figs. 8 and 10) integrally connected by a yoke 540. The arms 539 are mounted upon a pin 541 carried by a plate 542 secured to the plate 312.

From the above description, it will be clear that when the shaft 166 is rotated the arm 531 (Fig. 9) will be rocked first counter-clockwise and through the link 530, cause the segment 529 to be rocked counter-clockwise, and this in turn rotates the gear 528, the sleeve 527, and the spiral gear 526 in a clockwise direction (Fig. 9). The clockwise movement of the spiral gear 526 causes the shaft 522 and the gear 521 to be rotated clockwise (as viewed in Fig. 10), thereby rotating the gear 520 and the drum 515 counter-clockwise until the flat surface 516 of the drum 515 occupies the position which the flat surface 517 occupies in Fig. 10. The slip having been placed on the table 512 so that its left and lower edges conform with the lines 514 and 513, will be gripped between the true periphery of the drum 515 and the roller 537 and fed inward towards the frame 161 to a position so that an impression 545 (Fig. 26) may be made upon the original of the duplicate sales slip. After receiving the impression 545 the slip is fed to the right whereby a second impression 546 (Fig. 26) is made upon the duplicate portion of the slip. The means for causing these two impressions will be described later.

The means for feeding the slip between the two impressions just mentioned consists of the knurled drum 564 and its cooperating knurled roll 565 (Figs. 12 and 13). A cam disk 550 having a cam race 551 in the side thereof cooperates with an anti-friction roller 552 carried by an arm 553 loose on the shaft 393. Adjacent the arm 553 and loose on the shaft 393 is an arm 554 having a formed portion 555 in which is fastened a stud 556 surrounded by a compression spring 557. The other end of the compression spring surrounds a stud 549 carried by a formed portion 558 of the arm 553 and holds the arm 554 in contact with a stud 559 carried by the arm 553. Pivotally fastened to the lower end of the arm 554 is one end of a link 560, the other end of which is pivotally attached to one end of a bell crank 561 loose on a rod 562, supported at one end by the frame 160 and at its other end by a bracket 563 fast to the frame 161. The other arm of the bell crank 561 carries a stud 567 upon which is mounted the knurled drum 564 referred to. The knurled roll 565 is loosely mounted on a rod 566 carried by the bracket 219.

Pivotally mounted upon the stud 567 is an arm 569 carrying a clutch roller 570 which cooperates with the inner periphery of the drum 564. Pivotally fastened to the arm 569 is one end of a link 571 (Figs. 11 and 13) the other end of which is pivotally fastened to the lower end of a link 572. This last mentioned link is pivotally mounted upon an arm 573 secured to one end of a sleeve 574 loose on the shaft 393. The stud 575 carried by the link 572, and upon which the link 571 is pivotally mounted, cooperates with a cam slot 576 formed in an arm 577 loose on the shaft 393. Pivotally secured to the arm 577 at 578 is one end of a pitman 579, the other end of which is bifurcated to surround the shaft 166. Pitman 579 carries an anti-friction roller 581, which cooperates with a cam race 582 in the opposite side of the disk 550 in which the race 551 is cut.

The operation of the above described mechanism is as follows: Upon the counter-clockwise rotation of the shaft 166 (Fig. 13) the pitman 579 will be moved towards the right thereby rocking the arm 577 counter-clockwise. This movement of the arm 577 through the cam slot 576 moves the link 571 to the right thereby rocking the arm 569 counter-clockwise. During this counter-clockwise movement of the arm 569 the roller 570 will have no effect upon the drum 564, because a clutch roller 583 carried by the bell crank 561 is so positioned that during the movement of the arm 569 in a counter-clockwise direction this roller has a binding effect between a lug 584 carried by the bell crank 561 and the inner periphery of the drum 564, thereby preventing any counter-clockwise movement of said drum. After the arm 569 has been rocked counter-clockwise, as just described, the arm 553, through the cam race 551, is rocked counter-clockwise, (as viewed in Fig. 14). As the arm 553 is being moved counter-clockwise the arm 554 will also move counter-clockwise thus keeping in engagement with the pin 559 through the influence of the compression spring 557, which is strong enough for this purpose and thereby moves the link 560 to the right as viewed in Fig. 14, or to the left, as viewed in Fig. 13. The link 560 rocks the bell crank 561 clockwise and raises the drum 564 so that it contacts the underside of the slip which is on the table 512 and presses it against the roller 565. After this contact has been made the pitman 579 is moved to the left (Fig. 13) and through the arm 577 and cam slot 576 moves the link 571 to the left, thereby rocking the arm 569 in a clockwise direction. This clockwise movement of the arm 569 causes the roller 570 to grip the inner periphery of the drum 564 and rotate said drum clockwise a distance sufficient to position the slip to receive the second impression 546 (Fig. 26). The mechanism is so timed that the drum 564 contacts the underside of the slip and presses against the roller 565 after the drum has been rotated counter-clockwise (Fig. 10) to position the slip for proper printing of the first impression 545 (Fig. 26) but before the drum 515 releases its hold.

Immediately after the second impression upon the slip the cam race 551 (Fig. 14) causes the arm 553 to be rocked clockwise, (as viewed in Fig. 14), thereby rocking the arm 554 in a clockwise direction through the engagement of the pin 559 with said arm. The clockwise movement of the arm 554 (Fig. 14) causes the link 560 to be moved to the right (Fig. 13), thereby rocking the bell crank 561 counter-clockwise and lowering the drum 564 to its normal position.

Immediately after the second impression has been made upon the slip, the arm 531 (Fig. 9) is rocked clockwise, (as viewed in Fig. 9), to normal position, thereby rocking the segment 529 clockwise to its normal position, whereby the gear 528 is rotated counter-clockwise, thus causing the gear 521 (Fig. 10) to be rotated counter-clockwise. This movement of the gear 521 rotates the gear 520 and the drum 515 in a clockwise direction (as viewed to the right Fig. 8), thereby causing the true periphery of said drum to engage the slip and eject it upon the table 512.

Means is provided for varying the extent of feed between the two impressions 545 and 546 upon the slip. An arm 587 (Fig. 8) fast to the sleeve 574 has a slot 588 concentric with the shaft 393. The arm is locked in position by means of a screw 589. The sleeve 574 also carries, as previously stated, the arm 573, which has pivotally fastened thereto the link 572. When it is desired to change the extent of feed of the slip between impressions, the screw 589 is loosened and the arm 587 is moved, for example, in a clockwise direction thereby rocking the arm 573 clockwise (Fig. 13) whereby the link 572 is lowered and the stud 575 is moved downward in the slot 576, so that it will be a greater distance from the center of the shaft 393. After the arm 587 has been set the screw 589 is again tightened thus locking the parts in the adjusted position. It can be readily seen that when the stud 575 is moved a greater distance from the center of the shaft 393 than that shown in the drawings (Fig. 13), movement of the arm 577 will cause the stud 575 to be moved through a larger arc, thus moving the link 571 a greater distance, thereby causing the drum 564 to be rotated through a larger arc and thus causing the slip to be fed a greater distance. This adjustment is made to accommodate the various styles of slips which may be used.

*Slip printing mechanism.*

The means for taking the impressions upon the slip comprises a platen 590 (Figs. 12 and 13) carried in a housing 591 having integral therewith two arms 592 loose upon the shaft 403, the arms being made integral by a yoke 593. The housing 591 has pivotally fastened thereto the upper end of a link 594, the lower end of which is pivoted to an arm 595, which, in turn, is pivotally mounted upon an arm 596 fast on the shaft 403. The arm 595 is held in normal position against a pin 597 carried by the arm 596 by a coil spring 568 stretched between the arm 596 and the pivotal point of the link 594 and the arm 595. Also fast on the shaft 403 are two arms 598 and 599 carrying anti-friction rollers 600 and 601, which cooperate with cams 602 and 603 respectively (Fig. 12). The cams 602 and 603 are secured together and move as a unit. These cams are, by means of a hub, secured to a Geneva plate 604 (Fig. 15) loose on the shaft 390. The Geneva plate 604 cooperates with two studs 605 projecting laterally from a disk 606 fast on the cam 166. From the above description it can be seen that when the shaft 166 is rotated counter-clockwise (Fig. 15), the left hand stud 605 is the first to engage the Geneva plate 604, thereby rocking said plate in a clockwise direction, and also the cams 602 and 603, whereby the arms 598 and 599 will be rocked counter-clockwise and rock the shaft 403 likewise. The rocking of the shaft 403 causes the arm 596 to be rocked counter-clockwise, thereby raising the arm 595 and the link 594 upward, and causing the platen 590 to engage the lower set of type on the type wheels, whereby the first impression is made therefrom upon the inserted slip. As the first pin 605 passes out of engagement with the Geneva plate 604 the cams 602 and 603 rock the arms 598 and 599 clockwise thereby lowering the platen 590 so that the slip may be fed by the mechanism previously described to receive the second impression. After the slip has been fed the right hand pin 605 (Fig. 15) engages the Geneva plate 604 and operates said plate and the cams 602 and 603 and the arms 598 and 599 in identically the same manner as the left hand pin 605 operates them, as just described, whereupon the platen 590 is again raised to contact the type wheels so that the second impression 546 (Fig. 26) is made upon the inserted slip. When the right hand pin 605 (Fig. 15) leaves the Geneva plate 604 the cams 602 and 603 will be in the normal position and the platen 590 will have been lowered to its normal position, as illustrated in Fig. 13.

When there is no slip in the machine it is desired that no impression should be taken from the lower set of type wheels, therefore a mechanism is provided which cripples the full movement of the platen 590 when there is no slip in the machine. This mechanism comprises, an L-shaped arm 609 (Fig. 8) loosely mounted on the stud 610 carried by the frame 160. Integral with the arm 609 is another arm 611 which is bifurcated to surround a pin 612 carried by a link 613, one end of which link is pivotally fastened to an arm 614 mounted on a shaft 615 supported by the frames 160 and 161. Secured to the arm 614 by means of a hub is an arm 608, which cooperates with a pawl 616 mounted upon an arm 617 fast on the shaft 254, previously described. The left hand portion of the link 613 (Fig. 8) is U-shaped to surround the shaft 166. An anti-friction roller 618 is carried by this end of the link and co-operates with a cam disk 619 fast on the shaft 166. In the normal position the roller is in contact with a high portion 620 of said cam disk, and is held in contact therewith by a coil spring 621 stretched between the arm 611 and a pin carried by the frame 160. From the above description it can be seen that immediately upon the beginning of the rotation of the shaft 166 the portion 620 of the disk 619 is moved out of engagement with the roller 618, whereby the spring 621 through the arm 611 moves the link 613 to the right, thereby rocking the arm 608 counter-clockwise. The action of the spring 621 also rocks the L-shaped arm 609 counter-clockwise until the substantially vertical portion of said arm 609 strikes the inserted slip and moves said slip slightly upward until it contacts with a portion 622 of the plate 542 formed at right angles therewith, thereby preventing further counter-clockwise movement of the lever 609. The movement of the arm 608 in this case, that is when a slip is in the machine, is very slight, and therefore the shaft 615 is rocked through a very small angle. Fast to the shaft 615 is an arm 625 (Fig. 13) which carries a stud 626 that cooperates with an arm 627 integral with the arm 595 previously described, and which it will be remembered is pivoted to the lower end of the link 594. When a slip is in the machine, and the shaft 615 is rocked the arm 625 is rocked slightly counter-clockwise to position the stud 626, but does not move it into operative relation with the arm 627. Immediately after the rocking of the shaft 615 the shaft 254 is rocked counter-clockwise (as previously described in connection with a consecutive number mechanism) thereby rocking the arm 617, and carrying the pawl 616 downward so that said pawl engages the arm 608 and rocks said arm clockwise to normal position, thereby moving the link 613 to the left, and rocking the L-shaped arm 609 clockwise to the position shown in Fig. 8. The rocking of the shaft 615 by the pawl 616 causes the pin 626 to be moved out of operative relation with the portion 627 of the arm 595.

If there is no slip in the machine when the arm 609 is rocked counter-clockwise, as previously described, it will continue to move upward and through a hole in the ledge 622, thereby causing the shaft 615 and the arm 608 to be rocked a distance sufficient to position the stud 626 over the portion 627, and also to rock the arm 608 far enough so that the pawl 616, when moved downward by the arm 617, will not engage said arm 608. When the shaft 615 is rocked so that the arm 608 is out of reach of the pawl 616, the link 613 remains to the right, and the L-shaped lever remains upward until returned by the high portion 620 of the disk 619, which is near the end of the cycle. When the pin 626 is positioned above the arm 627, and the arm 596 is rocked counter-clockwise to cause an impression to be taken, the pin 626 causes the arm 595 to be rocked clockwise which rocks the link 594 counter-clockwise around its upper pivot point and stretches the spring 598. With the link 594 and the arms 595 in this position it can be seen that when the arm 596 is rocked counter-clockwise it will raise the platen 590 a shorter distance than before, due to the fact that the toggle composed of the link 594 and the arm 595 is no longer straight, as is the case when a slip is in the machine, but is broken. The toggle remains broken until the link 613 has been moved to the left to its normal position thereby rocking the shaft 615 clockwise and removing the pin 626 from over the arm 595, after which the spring 598 will rock the arm 595 counter-clockwise and the link 594 clockwise to the normal position.

It is desired to make a printed record upon the detail strip and also upon the check whenever a slip is printed upon. In the present machine the letter "S" is used for the purpose of denoting that a slip was in the machine and printed upon for certain operations. The letter "S" occupies the zero position on the highest amount type wheel 196. It will be remembered that the zero elimination mechanism eliminates the zeros to the left of an amount. It was also stated that the rack 182 co-operating with the highest amount type wheel was not eliminated under certain conditions, the reason for this being that the "S" is in the zero position and under certain conditions it is desired to print this "S," therefore the elimination mechanism must be crippled in order to do so. However, when there is no slip in the machine the zero elimination mechanism is operated for this highest amount rack in identically the same manner as for the other racks as previously described. The mechanism for crippling the zero elimination for the highest amount rack 182, so that an "S" may be printed when a slip is in the machine, comprises a bifurcated arm 630 (Figs. 8, 19 and 20) fast upon the shaft 472, said arm engages a pin 629 carried by the link 613. Also fast to the shaft 472 is an arm 631, carrying a pin 632, which projects into a cam slot 633 of a lever 634 (Fig. 20) loosely mounted on the shaft 501. The end 635 of the lever 634 normally engages a formed portion 636 (Figs. 11 and 18) integral with the arm 272, which cooperates with the highest amount rack as previously described, and holds it in the position shown in Fig. 18.

From the previous description it will be remembered that when a slip is in the machine that the link 613 is not moved very far to the right. The slot 633 in the lever 634 is concentric with the center of the shaft 472 a distance sufficient to take care of this short movement, so that when the arm 630 is rocked counter-clockwise thereby rocking the arm 631 counter-clockwise it will have no effect upon the lever 634. Therefore the arm 272 will be held in the position shown in Fig. 18 and the highest amount rack 182 will not be eliminated, and therefore a letter "S" will be printed from the zero position of the highest amount type wheel. When there is no slip in the machine it will also be remembered that the lever 609 is rocked counter-clockwise a greater distance than when a slip is in the machine, and that the link 613 is moved further to the right. This movement of the link 613 rocks the arm 630 counter-clockwise (Figs. 8 and 20) a greater distance than when a slip was in the machine, and therefore the arm 631 will be rocked through a greater angle, and the pin 632 will be moved far enough so that, because of the configuration of the cam slot 633, the lever 634 will be rocked in a clockwise direction, thereby disengaging the portion 635 from the formed portion 636 of the arm 272 cooperating with the highest amount rack 182. Thus when the arm 272 is moved forward as previously described, it will be allowed to rock clockwise, so that when it is moved to the left to normal position its shoulder 270 will engage the notch 271 of the highest amount rack 182 and move said rack one step to the left, thereby moving the type wheel associated with this rack one step to a non-print position. When the link 613 is moved to the left to its normal position it rocks the arms 630 and 631 to normal position, whereby the lever 634 is rocked clockwise to its normal position.

*Total printing.*

In total printing operations the total lever 83 (Fig. 4) is moved downward to the "Trans. totals", in order to print a total from the transaction totalizers; and to the "G. T. cash", to print the grand total from the cash totalizer. The lever is moved upward to the two positions indicated in Fig. 4 when it is desired to print a sub-total from any of the transaction totalizers, or the grand total from the cash totalizer. In totalizing operations all of the clerks' keys 82 are locked out with the exception of the "N" key, as was previously described, and all of the amount keys 80 (Fig. 2) are locked out, because in total printing the type wheels and the differential mechanism are both controlled by the totalizers and not by the depression of keys. The selection of the various totalizers is substantially the same as that described in the above mentioned Fuller Patent, No. 1,242,170, and as this selecting mechanism is not a part of the invention it will not be described herein.

In total printing operations the shaft 75 (Fig. 5) is given two rotations, and as it is only necessary that the printer cam shaft 166 have one rotation, mechanism is provided for preventing the disk 168 (Fig. 6) from rotating the shaft 166 during the first rotation of the shaft 75. This means is controlled by total lever 83. In total printing operations when the lever 83 is moved either upward or downward, or to any position except the "add" position, the plate 201 (Fig. 7) is rocked either clockwise or counter-clockwise according to the direction in which the lever 83 is moved. Upon movement of the plate 201 in either direction a cam slot 580 therein, through its engagement with a pin 585 carried by a lever 586, rocks said lever in a counterclockwise direction. The lever 586 is provided with an opening 607 into which projects a pin 623 carried by an arm 624 fast upon a shaft 628 carried by the side frames of the machine. Pivotally mounted upon the lever 586 at 637 is an arm 638 which carries a pin 639 engaged by a pawl 640 also pivotally mounted upon lever 586 at the point 641. The pawl 640 holds the arm 638 so that an edge 642 normally engages the pin 623. The edge 642 and an edge 643 of the opening 607 form a substantially L-shaped cam slot which, when the lever 586 is rocked counter-clockwise by the plate 201 causes the arm 624, and consequently the shaft 628, to be rocked in a clockwise direction. Also fast on the shaft 628 is an arm 644 (Fig. 5) having pivotally connected thereto the upper end of a link 645 the lower end of which is pivoted to a casting 646 loose upon a shaft 647. The casting is provided with a portion 648 for cooperating with a portion 649 integral with the pawl 169, previously described. From the above description it can be seen that, when the shaft 628 is rocked clockwise (Fig. 5) the element 646 will, through the link 645, be rocked in a counter-clockwise direction, thereby positioning the portion 648 thereon so that when the disk 168 is rotated during the first rotation of the shaft 75, said portion 648 will engage the portion 649 of the pawl 169 and thereby rock said pawl in a clockwise direction so that its nose will be rocked out of engagement with the boss 173 integral with the driving disk 172, which, it will be remembered from a previous description, is fast on the printer cam shaft 166. However, during the first rotation of the shaft 75 the shaft 628 is rocked counter-clockwise to normal position by means which is fully illustrated and described in the above mentioned Fuller patents. When this occurs the portion 648 of the casting 646 will be rocked out of engagement with the portion 649 of the pawl 169 so that during the second rotation of the shaft 75 and the disk 168 said pawl 169 will remain in the position shown in Fig. 6, whereby the disk 172 and consequently the shaft 166 will be given one rotation to effect operation of the printing mechanism as has been previously described throughout the preceding part of the specification.

The shaft 628 also has secured thereto two arms 650, only one of which is shown (Fig. 2), carrying a rod 651 which cooperates with the zero stop pawls 95 of all the amount banks. It is to be understood that there is one pawl for each bank of amount keys 80. When the shaft 628 is rocked in a counter-clockwise direction (Fig. 2) during totaling and subtotaling operations by mechanism not herein described but disclosed in the patents referred to, the rod 651 engages the lower portion of the zero stop pawls 95 and rocks said pawls clockwise, thereby moving them out of operative relation with the differential latch mechanism, so that the totalizer wheels 134 may control the setting of the differential mechanism, and consequently the type wheels, during total and sub-total printing operations. The means for locking out the transaction keys, and all of the clerks' keys 82 except the "N" key, during total and sub-total printing operations for the cash totalizer comprises a plate 652 (Fig. 18) slidably mounted upon two studs 653 carried by the frame 162. The plate 652 is provided with teeth 654, which mesh with a segment 655 loose on a stud 656, carried by the frame 162. Integral with this segment 655 is a segment 657 meshing with teeth 658 formed in the rack 200, which is controlled by the total lever 85, as previously described. The plate 652 is provided with two notches 659 and 660. The notch 659 cooperates with a portion 661 (Fig. 3) integral with the arm 106 which supports the detent 105 associated with the clerks' bank of keys. It will be remembered that upon depression of any of the clerks' keys except the "N" key the detent 105 is moved downward thereby rocking the arm 106 in a counter-clockwise direction. This movement of the arm 106 moves the portion 661 thereof to the right (Fig. 3), provided the plate 652 is in a position so that the notch 659 registers with the portion 661 of said arm 106. As before stated the "N" key has no effect upon the detent 105 because there is no pin 104 cooperating with this key. The movement of the rack 200 being controlled by the total lever, the plate 652 will also be controlled thereby, so that when the total lever is set in the extreme upper or the extreme lower position the slot 659 will not register with the portion 661 of the arm 106, therefore none of the keys 82 can be depressed except the "N" key which is, as before stated, the release key. An arm identical with the arm 661, and operated by the transaction keys 81, cooperates with a notch 660 in the plate 652 and registers therewith when the total lever is moved in either of the two transaction total printing positions. When the total lever is in the "add" position, as shown in Fig. 4, both of the notches 659 and 660 register with the portion 661 of the arm 106 so that the keys in the transaction bank and the clerks' bank may be depressed when the amount keys are depressed. The means for locking out the amount keys is the rod 651 carried by the arms 650, which, when the total lever is moved out of adding position, lies in front of the extreme lower portion of the arm 89, one of which cooperates with each of the amount banks. When the total lever is in the "add" position the rod 651 is out of engagement with the arm 89, therefore said arm may be rocked upon depression of any of the keys 80. The rack 200 also cooperates with the type wheel 208 which carries characters "X" and "Z" to denote sub-total and total printing operations. The "X" denotes subtotal operations and the "Z" denotes total printing operations. An illustration of subtotal and total printing operations is illustrated in lines six and seven of the detail strip 300 (Fig. 28).

*Operation.*

In order to help the reader to properly link up the various mechanisms described in the specification a general operation of the entire machine will now be described. Let us assume that clerk "B" made a cash sale of $2.25 and has made out a sales slip embodying the various items of the transaction. The clerk first depresses the amount keys to register $2.25, then the "cash" key, and finally his own initial key "B." Upon depression of the "B" key the machine is released and the drive shaft 75 is given one complete rotation. The latch mechanism 140 (Fig. 2) is controlled by the key shanks of the amount keys, thereby controlling the differential segment 132 so that the amount $2.25 will be added into the totalizers 134. The setting of the differential elements 132 through the levers 127, arms 156, segments 159, gears 176, shafts 177 and segments 180 sets the racks 182 so that the type wheels 196 will be set to print the amount $2.25. The differential mechanism for the transaction bank and the clerks' key bank is operated in substantially the same way, and sets the clerks' type wheel, and the transaction type wheel, so that "B" and "cash" will be printed at the proper time. Having made out a sales slip the operator before releasing the machine places the slip so that its left hand and bottom edges are approximately on the lines 514 and 513 respectively, of the table 512 (Fig. 11). During the first part of the operation the detail strip is fed to a position to receive an impression from the upper set of type on the type wheels 196 by the platen coming in contact with and pressing said strip against the ribbon 368 which lies directly above the aforesaid type. While the detail strip is being positioned and fed the slip is gripped between the drum 515 and roller 537 and also fed inward to a position to receive the first impression 545 (Fig. 26) from the lower set of type on the type wheels illustrated in Fig. 22. Just before the first impression upon the slip said slip is engaged by the drum 564 and the roller 565 and held in position during the first impression; the drum 564 and roller 565 then feed the slip to the right (Fig. 13), after which the impression platen 590 is again made to contact with the type and cause the impression 546 (Fig. 26) to be made upon the duplicate portion of the sales slip. The slip is again gripped by the drum 515 and roller 537 and ejected upon the table 512. Due to the fact that it is a cash operation, according to the system described herein for "cash," "received-on-account" and "paid out" transactions, a check is issued by the machine. Therefore, this being a cash operation the check feeding mechanism illustrated in Fig. 29 is operated and feeds the check paper to the position to be printed upon, and immediately after the printing of the second impression upon the slip the upper impression hammer is operated again and prints a check such as is illustrated in Fig. 27. After the check has been printed the knife 365 (Fig. 13) is rotated to sever the check from the paper, after which said check is gripped between the rollers 515 and 537 and quickly ejected from the machine. All of the zeros to the left in Fig. 2 in the amount are eliminated by the eliminating mechanism, previously described in detail, with the exception of the highest amount rack which is not eliminated due to the fact that a slip was printed, thereby controlling mechanism which prevented the elimination of this highest amount rack, as it was desired to print the "S" after the word "cash" upon the slip, check and detail strip. The "S" is in the zero position, as previously stated, and therefore the zero elimination for this rack is crippled under control of the slip when one is in the machine to be printed upon. The check issued by this operation is like that illustrated in Fig. 27. The sales slip receives the two impressions 545 and 546, and the detail strip receives the impression illustrated in the first line (Fig. 28).

The operation of the printing mechanism during totaling operations is substantially the same as that just described therefore it is not thought necessary to describe the operation of the machine during a total printing operation.

While the form of mechanism herein shown and described, is admirably adapted to fulfil the objects primarily stated, it is to be understood that it is not intended to confine the invention to the one form of embodiment therein disclosed, for it is susceptible of embodiment in various forms all coming within the scope of the claims which follow.

What is claimed is:—

1. In a machine of the class described, the combination of printing devices for making a plurality of impressions on record material at each operation of the machine, automatic means for placing the record material in position to receive the first impression and to remove the same after the last impression, and means independent of said automatic means for feeding the record material after it has received the first impression into position to be again acted upon by the printing mechanism.

2. In a machine of the class described, the combination of printing devices for making a plurality of impressions on record material at each operation of the machine, automatic means for moving the record material laterally with respect to the printing elements to position the record material for receiving the first impression and to remove the record material laterally with respect to the printing mechanism after the last impression, and means for feeding the record material after it has received the first impression into position for receiving another impression.

3. In a machine of the class described, the combination of printing devices for making a plurality of impressions on record material at each operation of the machine, feeding devices adapted to rotate in one direction to place the record material in position to receive the first impression and to rotate in the reverse direction to eject the record material after the last impression, another set of feeding devices arranged to feed the record material between the impressions of the printing mechanism, means for operating the first mentioned feeding devices to move first in one direction and then in another, and means for driving the other feeding devices always in the same direction.

4. In a machine of the class described, the combination of type carriers for printing on record material, impression means cooperating therewith, means for operating said impression means twice to make two impressions upon said record material during one operation of the machine, automatic placing and ejecting mechanism, means for operating the placing and ejecting means in one direction to place the record material and in the reverse direction to eject the same, and means for feeding the record material after it has received the first impression into a position to receive the second impression.

5. In a machine of the class described, the combination of printing devices for making a plurality of impressions upon record material during one operation of the machine, record feeding and ejecting mechanism for feeding the record material into position to receive the first impression and to eject it after receiving the second impression, and record feeding means adapted to move the record material at right angles to the movement of the first mentioned feeding means to feed the record material after it has received the first impression into position to receive the second impression.

6. In a machine of the class described, the combination of printing devices for making two impressions upon record material at each operation of the machine, feeding rollers adapted to be moved in one direction to feed the record material into the printing mechanism and in the opposite direction to remove the record material therefrom, and feeding mechanism always rotating in the same direction for feeding the record material after it has received the first impression into position to receive the succeeding impression.

7. In a machine of the class described, the combination of printing devices adapted to make a plurality of impressions upon record material, placing and removing mechanism for placing the record material into position to receive the first impression and to withdraw it after receiving the last impression, feeding mechanism adapted to grasp the record material before it is released by the placing and removing mechanism to move the record material into position to receive the last impression and to hold the record material until it is grasped by the placing and removing mechanism which removes it from the machine.

8. In a machine of the class described, the combination of a main operating mechanism, a plurality of type carriers for printing on record material, impression mechanism cooperating therewith, means operated by the main operating mechanism for actuating said impression mechanism to make two impressions upon said record material, means for positioning said record material to receive the first impression, means operated by the main operating mechanism for feeding said record material into position to receive the second impression, and means operated by the main operating mechanism for rocking said positioning means in one direction to position the record material and for rocking the same in the opposite direction to eject the record material from the machine.

9. In a machine of the class described, the combination of a main operating mechanism, a plurality of type carriers for printing on record material, impression means cooperating therewith and operated by the main operating machanism for making two impressions on said record material, means for feeding the record material between the two impressions, said means being normally disengaged, and means operated by the main operating mechanism for resiliently engaging and for positively disengaging said feeding means.

10. In a machine of the class described, the combination of means for feeding a record strip, means for feeding check paper, a printing mechanism adapted to make an impression on either the record strip only or on both the record strip and check paper at each operation of the machine, a slidable driving member having two positions and adapted in one position to actuate the printing mechanism once only for each operation of the machine and in the other position to operate the printing mechanism twice during each operation of the machine, manually operated means for positioning the slidable driving member, automatic means for positioning the slidable driving member, an actuating rack having various control characteristics formed therein, manipulative devices for controlling the position of the rack, and a pivoted member adapted to cooperate with said characteristics of said rack to control the action of the automatic positioning means, whereby the effective operation of said automatic means on the slidable driving member is determined.

11. In a machine of the class described, the combination of means for feeding a record strip, means for feeding check paper, a printing mechanism adapted to make an impression on either the record strip only or on both the record strip and the check paper at each operation of the machine, a slidable driving member having two positions and adapted in one position to actuate the printing mechanism once only and to render the check paper feeding mechanism ineffective during an operation of the machine and in the other position to operate the printing mechanism twice and to render the check paper feeding mechanism effective during each operation of the machine, manually operated means for positioning the slidable driving mechanism, automatic means for positioning the slidable driving member, an actuating rack having various control characteristics formed therein, manipulative devices for controlling the positioning of the rack, and a pivoted member adapted to cooperate with said characteristics of said rack to control the action of the automatic positioning means, whereby the effective operation of said automatic means on the slidable driving member is determined.

12. In a recording mechanism, the combination of means for placing record materials successively into positions to receive records, and means for simultaneously ejecting said materials.

13. In a recording mechanism, the combination of means for moving record material in opposite directions to place it in record-receiving position and to move it out of record-receiving position, and means for positioning said material to receive a second record prior to the time it is ejected.

14. In a recording mechanism, the combination of means for moving record material in one direction to position it to receive a record, and means for moving said material in a different direction into another record-receiving position.

15. In a recording mechanism, the combination of means for feeding record material after it has received a record into another record-receiving position, and means for ejecting said material in a direction non-parallel to the direction of feeding.

16. In a machine of the class described, a printing mechanism involving means for moving record material in one direction, means for moving said material at right angles to said direction, and means for moving said material parallel to the line of one of said previous movements, all of said movements taking place at each operation of the machine.

17. In a machine of the class described, a recording mechanism involving means for placing record material in position to receive a record, means for moving said material in a different direction to position it to receive another record, and means for moving said material out of the machine.

18. In a machine of the class described, the combination of a record producing mechanism, automatic means for feeding record material into a record receiving position, and automatic means for moving said record material in a direction non-parallel to the direction of feeding.

19. In a machine of the class described, the combination of a record producing mechanism, automatic means for feeding record material after it has received a record into another record receiving position, and automatic means for moving said material non-parallel to the direction of feeding.

20. In a machine of the class described, the combination of a recording mechanism adapted to operate one or more times during an operation of the machine, manipulative devices, a differentially slidable rack controlled by said devices, means on said rack for compelling a certain number of operations of said recording mechanism when certain of said manipulative devices are operated, and manually operated means for controlling the number of operations of said recording mechanism when other manipulative devices are operated.

21. In a machine of the class described, the combination of a recording mechanism adapted to operate one or more times during each operation of the machine, adjustable recording elements, a differentially slidable member for adjusting said elements, and means formed on said member for compelling a certain number of operations of said recording mechanism for certain positions of said member.

22. In a machine of the class described, the combination of a recording mechanism involving adjustable recording elements adapted to produce a record on record material, means for eliminating the recording of zeros to the left of the highest order digit of an amount involved, said means involving an element for each recording element, pivoted means directly cooperable with the eliminating element for the highest recording element for disabling said eliminating element, and means controllable by record material for rendering said disabling means effective.

23. In a machine of the class described, the combination of a printing mechanism, driving means therefor, a plurality of manipulative means for rendering the driving means effective or ineffective, and a single manipulative means for controlling the effectivity of said plurality of manipulative means.

24. In a machine of the class described, the combination of a printing mechanism either operable or non-operable upon operation of the machine, a plurality of manipulative keys for preventing operation of the printing mechanism, and a manually operated knob for destroying the control exercised by said keys.

25. In a machine of the class described, the combination of a printing mechanism, a plurality of manipulative means for determining whether or not said mechanism shall operate during an operation of the machine, and another manipulative means for predetermining an operation of the printing mechanism regardless of which of the plurality of manipulative means has been operated.

26. In a machine of the class described, the combination of a printing mechanism, operating means therefor, a non-rotatable member slidable into positions to render said operating means effective or ineffective, means for moving said slidable member operable upon each operation of the machine, and manipulative means for rendering said second mentioned means effective or ineffective.

27. In a machine of the class described, the combination of a printing mechanism, a longitudinally shiftable means for rendering the printing mechanism operable or inoperable during an operation of the machine, means operable during each operation of the machine for shifting said shiftable means and adapted to be connected to and disconnected from said shiftable means, and manipulative means controlling said shifting means.

28. In a machine of the class described, the combination of a printing mechanism, means for operating said mechanism adapted to be rendered effective or ineffective, a slidable rack, manipulative means for controlling the movement of the rack, a plurality of high and low positions on said rack, and a member cooperable with said positions on said rack to control the effectivity of said operating means.

29. In a machine of the class described, the combination of a printing mechanism, means for operating said mechanism adapted to be rendered effective or ineffective, a slidable rack, manipulative means for controlling the movement of the rack, a plurality of high and low positions on said rack, and a pivoted member cooperable with said positions on said rack to control the effectivity of said operating means.

30. In a machine of the class described, the combination of a printing mechanism, means for operating said mechanism adapted to be rendered effective or ineffective, a slidable member for controlling the effectivity of said operating means, pivoted means adapted to be engaged with or disengaged from said slidable member, and manipulative means for controlling said pivoted means.

31. In a machine of the class described, the combination of a printing mechanism, means for operating said mechanism adapted to be rendered effective or ineffective, a slidable member for controlling the effectivity of said operating means, slidably mounted pivoted means adapted to be engaged with or disengaged from said slidable member, and manipulative means for controlling said pivoted means.

32. In a machine of the class described, the combination of a printing mechanism, means for operating said mechanism adapted to be rendered effective or ineffective, reciprocating means operated during each operation of the machine, pivoted means carried by reciprocating means for controlling the effectivity of said operating means, and manipulative means for controlling said pivoted means.

33. In a machine of the class described, the combination of a printing mechanism, operating mechanism therefor, means for connecting and disconnecting said printing mechanism from said operating mechanism involving a pivotally mounted reciprocating member spring actuated about its pivot to cause said printing mechanism to be disconnected from said operating means, and manipulative means for directly moving said member against the operation of said spring to cause said printing mechanism to be connected to said operating mechanism.

34. In a machine of the class described, the combination of a printing mechanism, operating mechanism therefor, means for connecting and disconnecting said printing mechanism and said operating mechanism involving a pivotally mounted reciprocating member spring actuated about its pivot to cause said printing mechanism to be disconnected from said operating means, and manipulative means for setting up a condition for causing said member to be moved against the operation of said spring to cause said printing mechanism to be connected to said operating mechanism.

35. In a machine of the class described, the combination of a printing mechanism, operating mechanism therefor, means for operatively connecting and disconnecting said operating mechanism and printing mechanism, a plurality of pivoted elements for controlling said means, and manipulative means for controlling said pivoted elements.

36. In a machine of the class described, the combination of a printing mechanism, operating mechanism therefor, means for operatively connecting and disconnecting said operating mechanism and printing mechanism, a plurality of pivoted elements for controlling said means, manipulative means for operating one pivoted element directly, and other manipulative means for controlling the movement of the other pivoted element during an operation of the machine.

37. In a machine of the class described, the combination of a printing mechanism, operating means therefor adapted to be connected to and disconnected from said printing mechanism, means operable during each operation of the machine for connecting or disconnecting said mechanisms, manipulative means for directly actuating said means for causing the same to connect or disconnect said mechanisms, and manipulative controlled differentially movable actuating means for also directly actuating said means for connecting and disconnecting said mechanisms.

38. In a machine of the class described, the combination of a printing mechanism, an operating mechanism therefor, a differentially slidable member provided with high and low positions, a pivoted member for controlling the connection and disconnection of said mechanisms, and a feeler projection on said pivoted member beveled to facilitate movement thereof from low to high positions as said slidable member is moved differentially.

In testimony whereof I affix my signature.

BERNIS M. SHIPLEY.